(12) United States Patent  (10) Patent No.: US 7,845,826 B2
Aylward et al.  (45) Date of Patent: Dec. 7, 2010

(54) MULTILAYERED INTEGRATED BACKLIGHT ILLUMINATION ASSEMBLY

(75) Inventors: Peter T. Aylward, Hilton, NY (US); John C. Brewer, Rochester, NY (US); Robert P. Bourdelais, Pittsford, NY (US); Qi Hong, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 358 days.

(21) Appl. No.: 12/008,918

(22) Filed: Jan. 15, 2008

(65) Prior Publication Data

US 2009/0180282 A1   Jul. 16, 2009

(51) Int. Cl.
*F21V 13/04*  (2006.01)
(52) U.S. Cl. ............... 362/243; 362/242; 362/607; 362/97.3
(58) Field of Classification Search .......... 362/97.1, 362/97.2, 97.3, 97.4, 237, 240, 242, 243, 362/245, 246, 331, 332
See application file for complete search history.

(56) References Cited

U.S. PATENT DOCUMENTS

| | | | |
|---|---|---|---|
| 5,499,112 A | | 3/1996 | Kawai et al. |
| 7,360,938 B2 * | | 4/2008 | Mizuyoshi ............ 362/616 |
| 2005/0180124 A1 * | | 8/2005 | Adachi et al. .......... 362/97.1 |
| 2006/0002146 A1 * | | 1/2006 | Baba ..................... 362/613 |
| 2008/0055931 A1 * | | 3/2008 | Verstraete et al. ....... 362/612 |

OTHER PUBLICATIONS

M. Zeiler et al.; "44.5L: Late-News Paper: Optimization Parameters for LED Backlighting Solutions"; 2006 SID International Symposium: digest of technical papers/SID-Society for Information Display; pp. 1524-1527.

* cited by examiner

*Primary Examiner*—Y My Quach Lee
(74) *Attorney, Agent, or Firm*—Edwin Oh

(57) ABSTRACT

The present invention provides a multilayered integrated backlight illumination assembly for an LCD display comprising a substrate for providing structural and functional support to the assembly, a bottom reflector provided on the substrate and a plurality of solid state light sources provided in an opening of the bottom reflector for providing a point light source. The invention further provides a plurality of primary light films having light redirecting areas provided between the plurality of solid state light sources for redirecting and spreading the point light source to a uniform plane of light, a plurality of secondary light films having light redirecting areas provided between the plurality of solid state light sources for redirecting and spreading the point light source to a uniform plane of light and a binding means for binding the primary and secondary light films together. Further, the invention provides a top diffuser for diffusing the uniform plane of light and wherein the plurality of light films has a thickness between 0.1 mm to 1.0 mm and a bending stiffness between 50 to 1200 millinewtons.

9 Claims, 18 Drawing Sheets

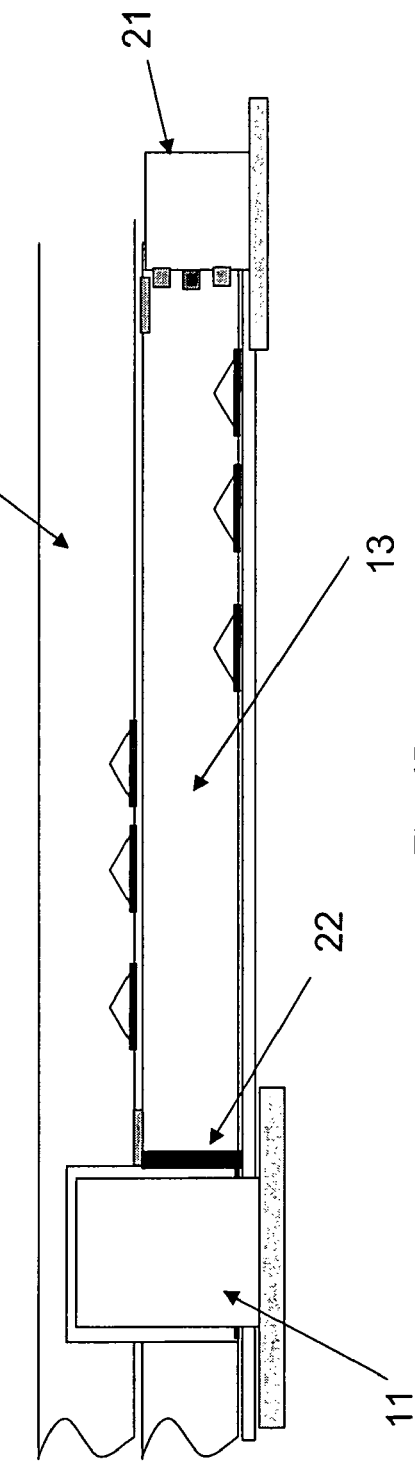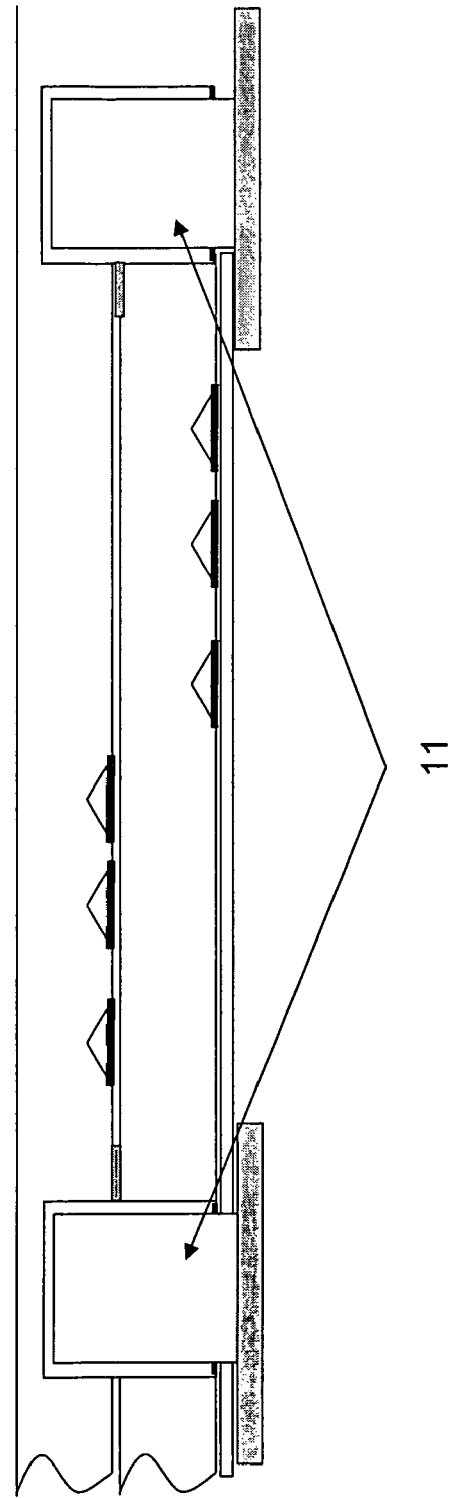
Fig. 4A
Fig. 4B

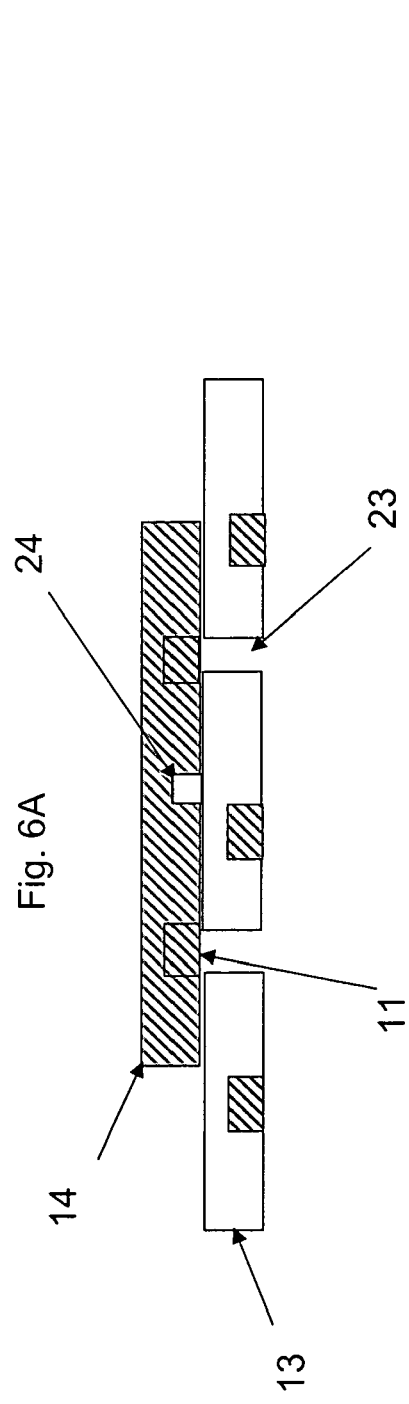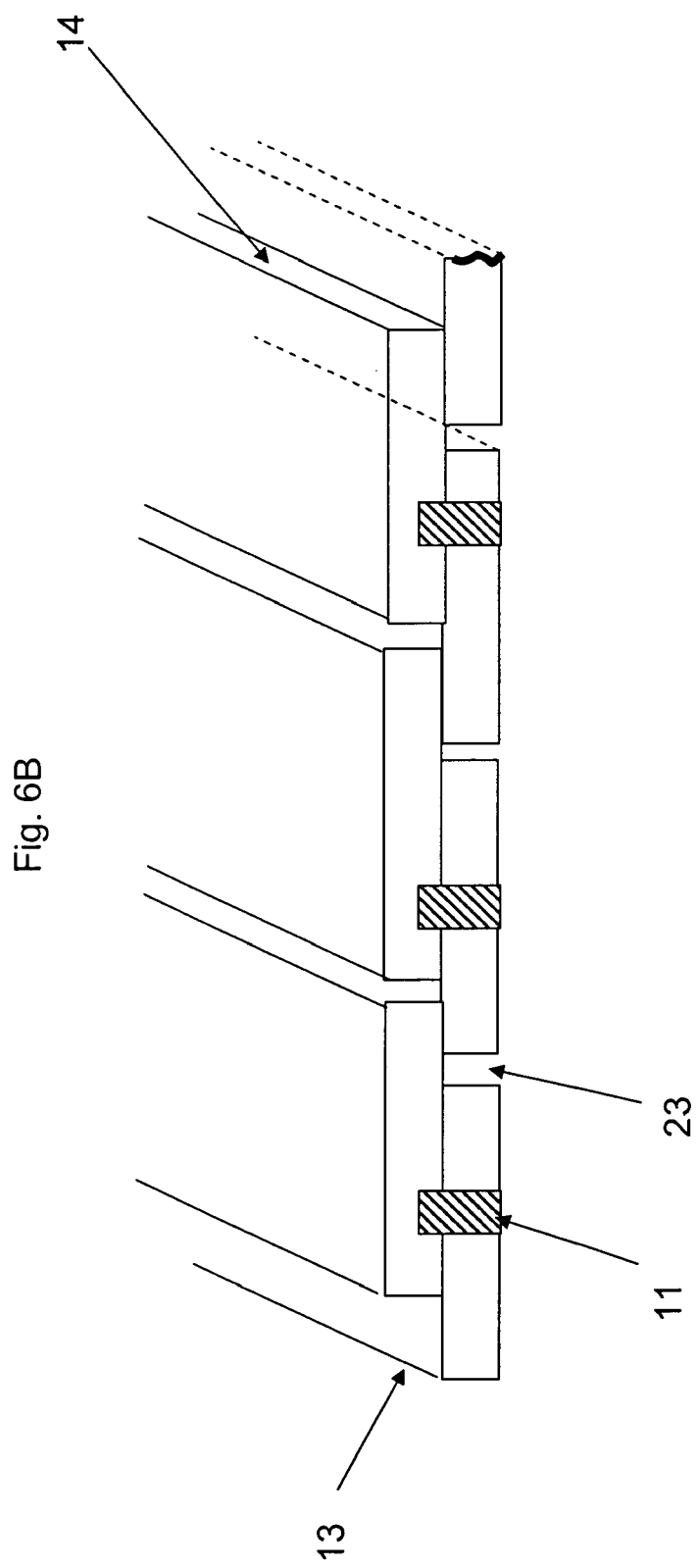
Fig. 6A
Fig. 6B

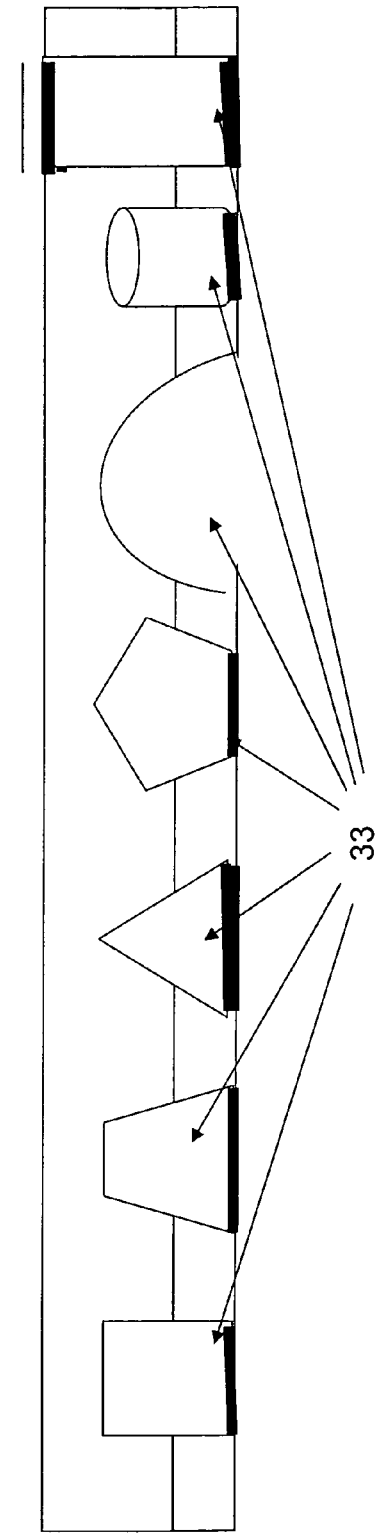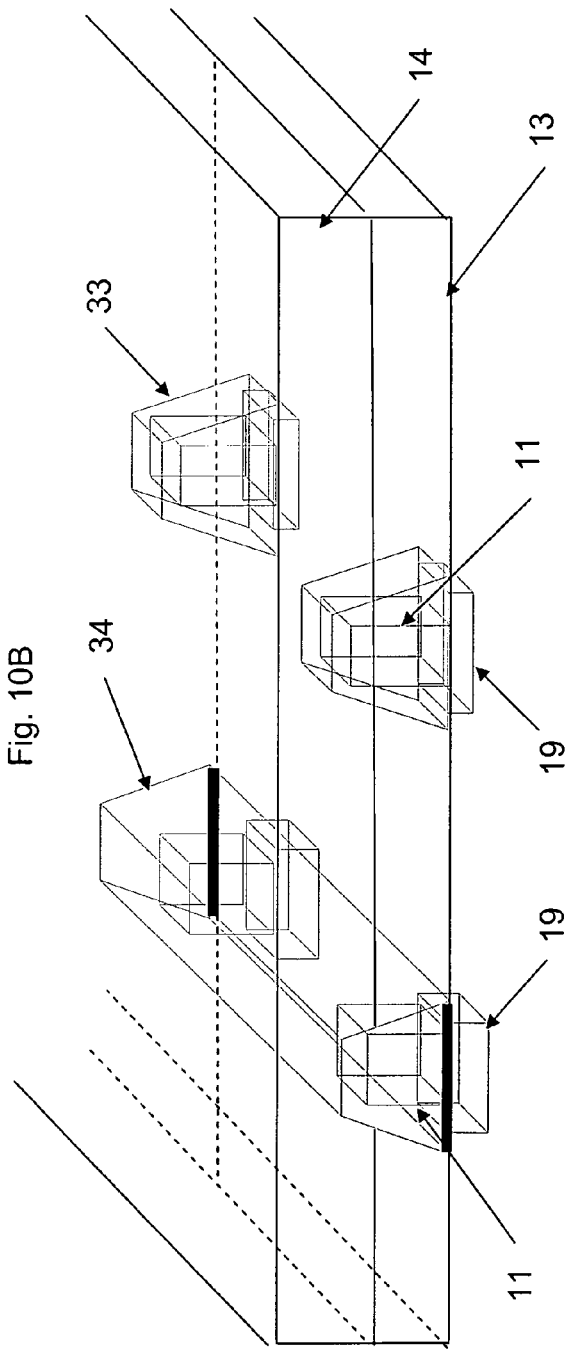

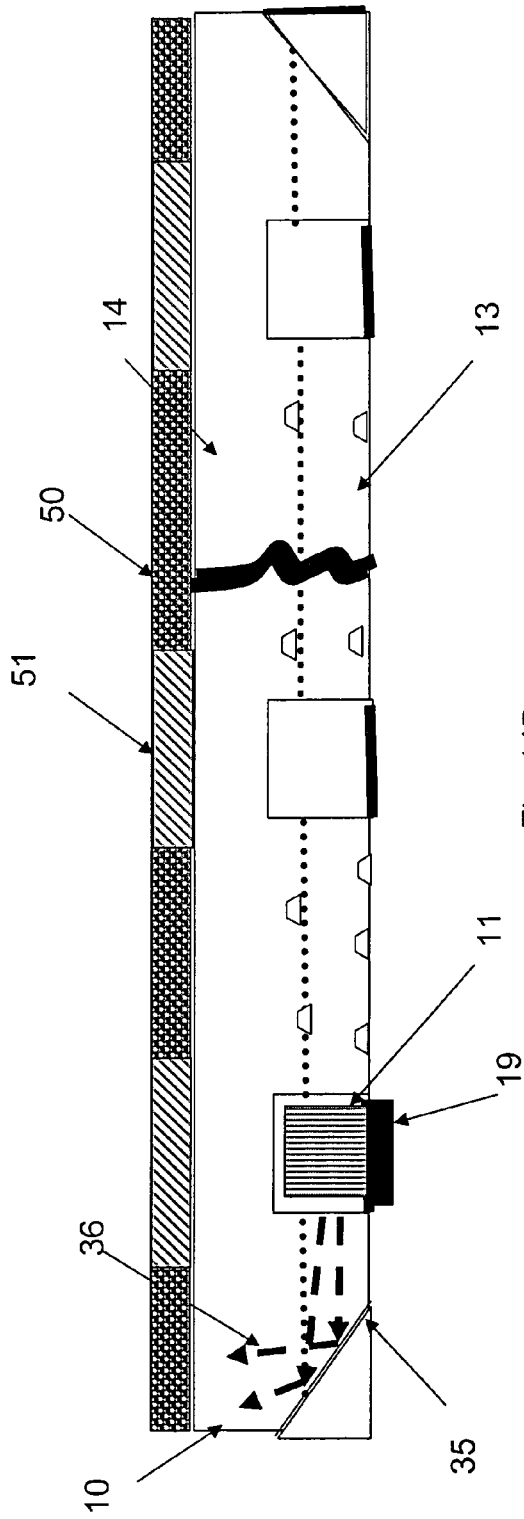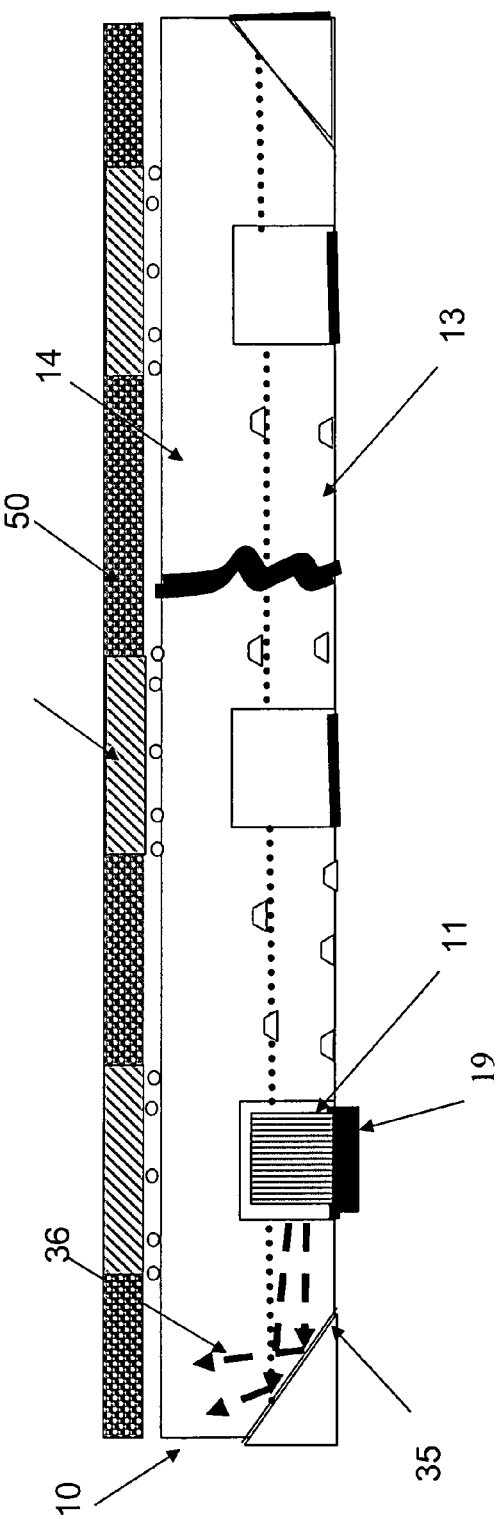

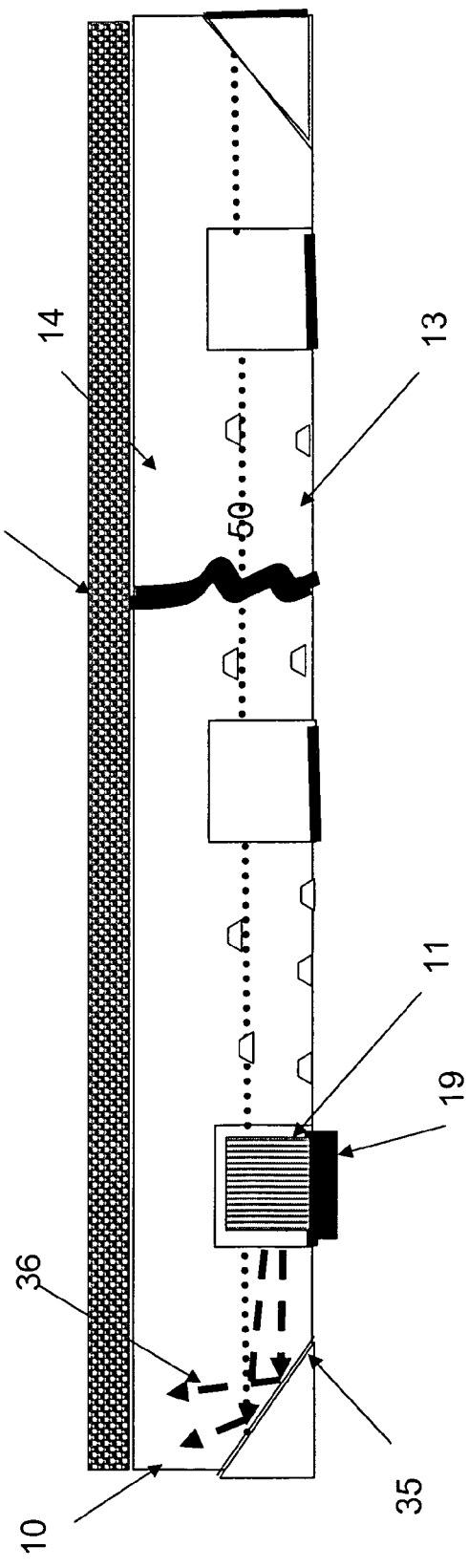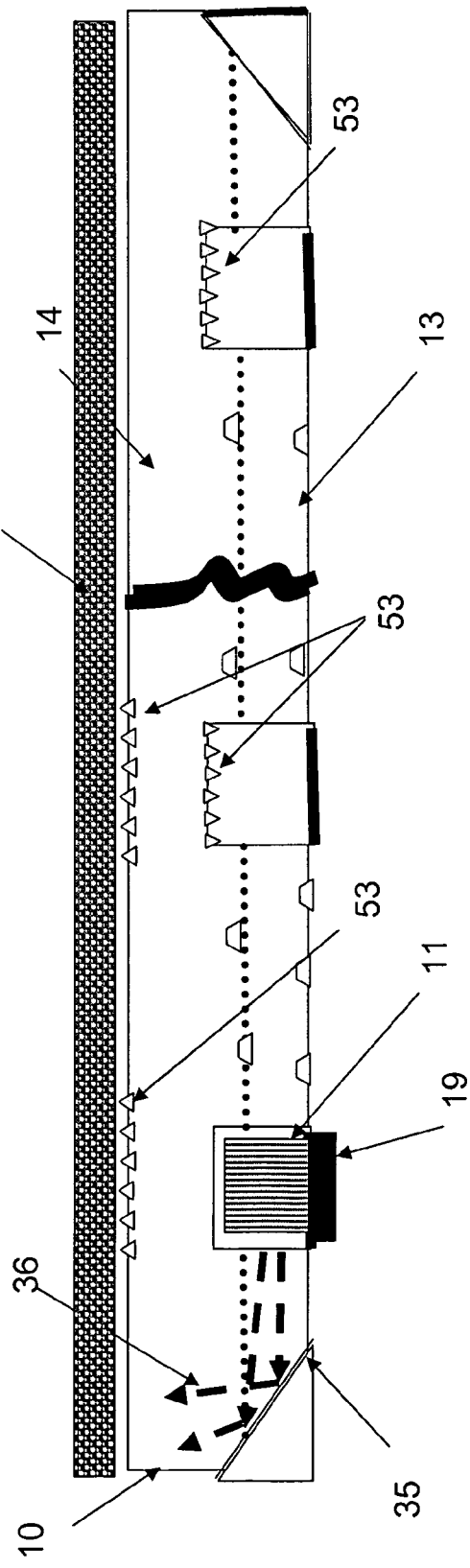

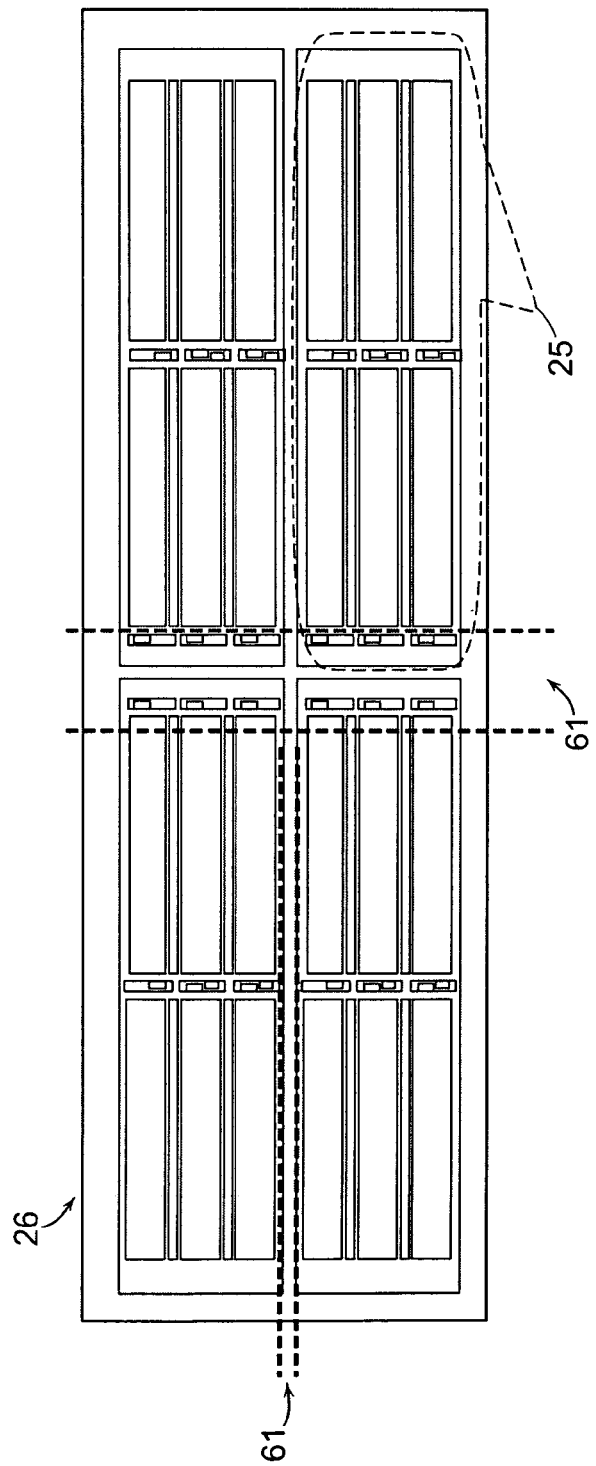
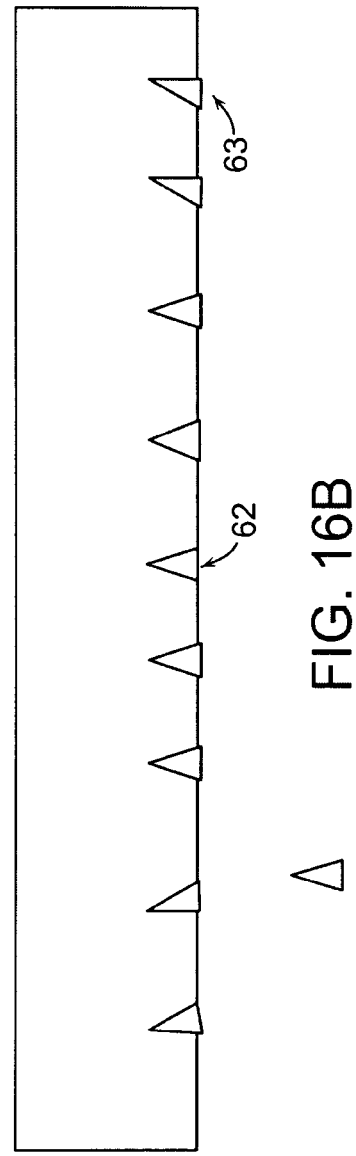
FIG. 16A
FIG. 16B

MULTILAYERED INTEGRATED BACKLIGHT ILLUMINATION ASSEMBLY

FIELD OF THE INVENTION

This invention relates to the art of backlight apparatus for a display and a liquid crystal display employing such apparatus. In particular, the present invention relates to a Liquid Crystal Display (LCD) backlight with solid-state light sources.

BACKGROUND OF THE INVENTION

While liquid crystal displays offer a compact, lightweight alternative to cathode ray tube (CRT) monitors, there are many applications for which the image quality of LCD displays are not yet satisfactory, particularly as the relative size of these devices increases. Larger LCD panels, such as those used in laptop computer or larger displays, are transmissive, and thus require a backlight. This type of light-providing surface, positioned behind the LCD panel, directs light outwards and towards the LCD.

Conventional approaches for backlighting use various arrangements of cold cathode fluorescent (CCFL) light sources with light guide plates, one or more types of enhancement films, polarization films, reflective surfaces, and other light conditioning elements. Conventional flat panel backlight solutions using side-mounted CCFLs are less and less desirable as display size increases and, particularly as display area grows, can be susceptible to warping in manufacture or due to heat. Light-guiding backlight techniques that are conventionally employed for smaller devices are increasingly hampered by low brightness or luminance levels and by problems related to poor uniformity as the display size increases, such as would be needed for digital TV, for example. Existing backlight apparatus for LCD displays and other display and illumination applications, often using banks of CCFLs lined up in parallel, can be relatively inefficient. These display solutions can also be relatively thick, due to the need to house the CCFL and its supporting films and surfaces behind the LC panel. The CCFL light source itself presents an environmental problem for disposal, since these devices contain some amount of mercury. To compensate for uniformity and brightness problems with conventional CCFL-based backlights, a number of supporting films are conventionally interposed between the backlight and the display, or disposed following the display, such as relatively high-cost reflective polarization films. As is well known, the spectral characteristics of CCFLs are relatively poor when compared to other types of light sources.

Faced with the inherent difficulties and limitations to CCFL used in backlighting applications, researchers have been motivated to pursue alternative backlighting approaches. A number of solutions have been proposed utilizing Light-Emitting Diodes (LEDs). Recent advances in LED brightness, color output, and overall performance, with continuing reduction in cost, make LEDs, lasers, and solid-state light sources in general particularly attractive. However, because LEDs and lasers act as point light sources, appropriate solutions are needed for redirecting and spreading this light to provide the uniform plane of light that is needed for backlighting and to provide the necessary color uniformity.

One approach for providing backlight illumination using LEDs is using an array arrangement, such as that described in the paper by M. Zeiler, J. Huttner, L. Plotz, and H. Ott entitled "Late-News Paper: Optimization Parameters for LED Backlighting Solutions" SID 2006 Digest pp. 1524-1527. Using this type of solution, an array of LED clusters using Red (R), Green (G), and Blue (B) LEDs is deployed as a backlight for an LCD displays. Two types of clusters are described: RGGB and RGB. However, except for specialized uses such as for some types of instrument panels and for very high-end monitors and TV panels, array arrangements do not appear promising, due to problems of poor color and brightness uniformity, high parts count, high heat, and dimensional requirements.

Light guides have been employed for spreading light from a point source in order to form a line of light. For example, U.S. Pat. No. 5,499,112 entitled "Light Guide, Illuminating Device Having the Light Guide, and Image Reading Device and Information Processing Apparatus Having the Illuminating Device" to Kawai et al. discloses redirecting light from one or more LEDs to a line in a scanning apparatus, using a single light guide having extraction features distributed along its length There has been considerable work directed to the goal of providing LED backlighting. However, although there have been a number of solutions proposed, there are significant drawbacks inherent to each type of solution, particularly when faced with the problem of backlighting for a display panel of standard laptop dimensions or larger.

In addition to these drawbacks, conventional solutions generally fail to address important challenges for high-quality color imaging, required for widespread commercialization and acceptance of LC displays. Color gamut is one important consideration that is of particular interest to display designers. Conventional CCFLs provide a measure of color quality that is acceptable for many applications, offering up to about 70% of the NTSC color gamut. Although this may be acceptable for laptop and computer monitor applications, it falls short of what is needed for full-color TV displays.

In contrast to CCFL light sources, LEDs and other solid-state light sources, because of their relatively high degree of spectral purity, are inherently capable of providing 100% or more of the NTSC color gamut. In order to provide this enlarged color gamut, three or more different-colored LEDs or other solid-state sources are needed. To support such an expanded color gamut when using LEDs and other solid-state light sources, a high level of color mixing is required from the backlighting apparatus. As is well known to those skilled in the imaging display art, achieving a good level of color uniformity when using solid-state light sources, such as Red (R), Green (G), and Blue (B) LEDs, is particularly challenging. Conventional backlighting solutions that employ larger-area light guides, such as those described above, would provide correspondingly inferior color mixing. Other challenges related to backlighting for larger scale displays include the need for low-cost assembly, light efficiency, uniformity, and compact size. Conventional LED backlighting solutions fall short of what is needed to meet these additional requirements. Additionally, it would be particularly useful to eliminate the need for thick bulky light guide plates or thick lightbars, which may be possible where uniformity and brightness are sufficiently improved.

Thus, it can be seen that there is a need for an LED backlight solution that can be inexpensively manufactured, has minimal thickness, and provides color mixing with good uniformity, high brightness, and high levels of efficiency.

SUMMARY OF THE INVENTION

In one embodiment the present invention provides a multilayered integrated backlight illumination assembly for an LCD display comprising a substrate for providing structural and functional support to the assembly; a bottom reflector provided on the substrate; a plurality of solid state light sources provided in an opening of the bottom reflector for providing a point light source; a plurality of primary light films having light redirecting areas provided between the plurality of solid state light sources for redirecting and spreading the point light source to a uniform plane of light; a plurality of secondary light films having light redirecting areas provided between the plurality of solid state light sources for redirecting and spreading the point light source to a uniform plane of light; a binding means for binding the primary and secondary light films together; a top diffuser for diffusing the uniform plane of light; and wherein the plurality of light films has a thickness between 0.1 mm to 1.0 mm and a bending stiffness between 50 to 1200 millinewtons.

In another embodiment the invention provides a multilayered integrated backlight illumination assembly for an LCD display comprising: a substrate for providing structural and functional support to the assembly; a bottom reflector provided on the substrate; a plurality of solid state light sources provided in an opening of the bottom reflector for providing a point light source; a plurality of primary light films having light redirecting areas provided between the plurality of solid state light sources for redirecting and spreading the point light source to a uniform plane of light; a plurality of secondary light films having light redirecting areas provided between the plurality of solid state light sources for redirecting and spreading the point light source to a uniform plane of light; a polymer layer with beads provided between the primary and secondary light films to adhere the films together; a top diffuser for diffusing the uniform plane of light; and wherein the plurality of light films has a thickness between 0.1 mm to 1.0 mm and a bending stiffness between 50 to 1200 millinewtons.

In another embodiment the invention provides a multilayered integrated backlight illumination assembly for an LCD display comprising: a substrate for providing structural and functional support to the assembly; a bottom reflector provided on the substrate; a plurality of multi-colored solid state light sources provided in an opening of the bottom reflector for providing a red, green or blue point light source; a plurality of primary light films having light redirecting areas provided between the plurality of solid state light sources for redirecting and spreading any of the red, green or blue point light source to a uniform plane of light; a plurality of secondary light films having light redirecting areas provided between the plurality of solid state light sources for redirecting and spreading any of the red, green or blue point light source to a uniform plane of light; a plurality of tertiary light films having light redirecting areas provided between the plurality of solid state light sources for redirecting and spreading any of the red, green or blue point light source to a uniform plane of light; an adhesive pad provided between the primary, secondary and tertiary light films to adhere the films together; a plurality of color mixing sections provided in the light redirecting areas for providing improved color uniformity from the multi-colored solid state light sources; a top diffuser for diffusing the uniform plane of light; and wherein the plurality of light films has a thickness between 0.1 mm to 1.0 mm and a bending stiffness between 50 to 1200 millinewtons.

BRIEF DESCRIPTION OF THE DRAWINGS

FIGS. 4A and 4B illustrate another embodiment of the multilayered integrated backlight illumination assembly of the present invention;

FIGS. 6A and 6B illustrate another embodiment of the multilayered integrated backlight illumination assembly of the present invention;

FIGS. 10A and 10B illustrate another embodiment of the multilayered integrated backlight illumination assembly of the present invention;

FIGS. 14A and 14B illustrate another embodiment of the multilayered integrated backlight illumination assembly of the present invention;

FIGS. 15A and 15B illustrate another embodiment of the multilayered integrated backlight illumination assembly of the present invention;

FIGS. 16A and 16B illustrate another embodiment of the multilayered integrated backlight illumination assembly of the present invention;

DETAILED DESCRIPTION OF THE INVENTION

Figure 1:
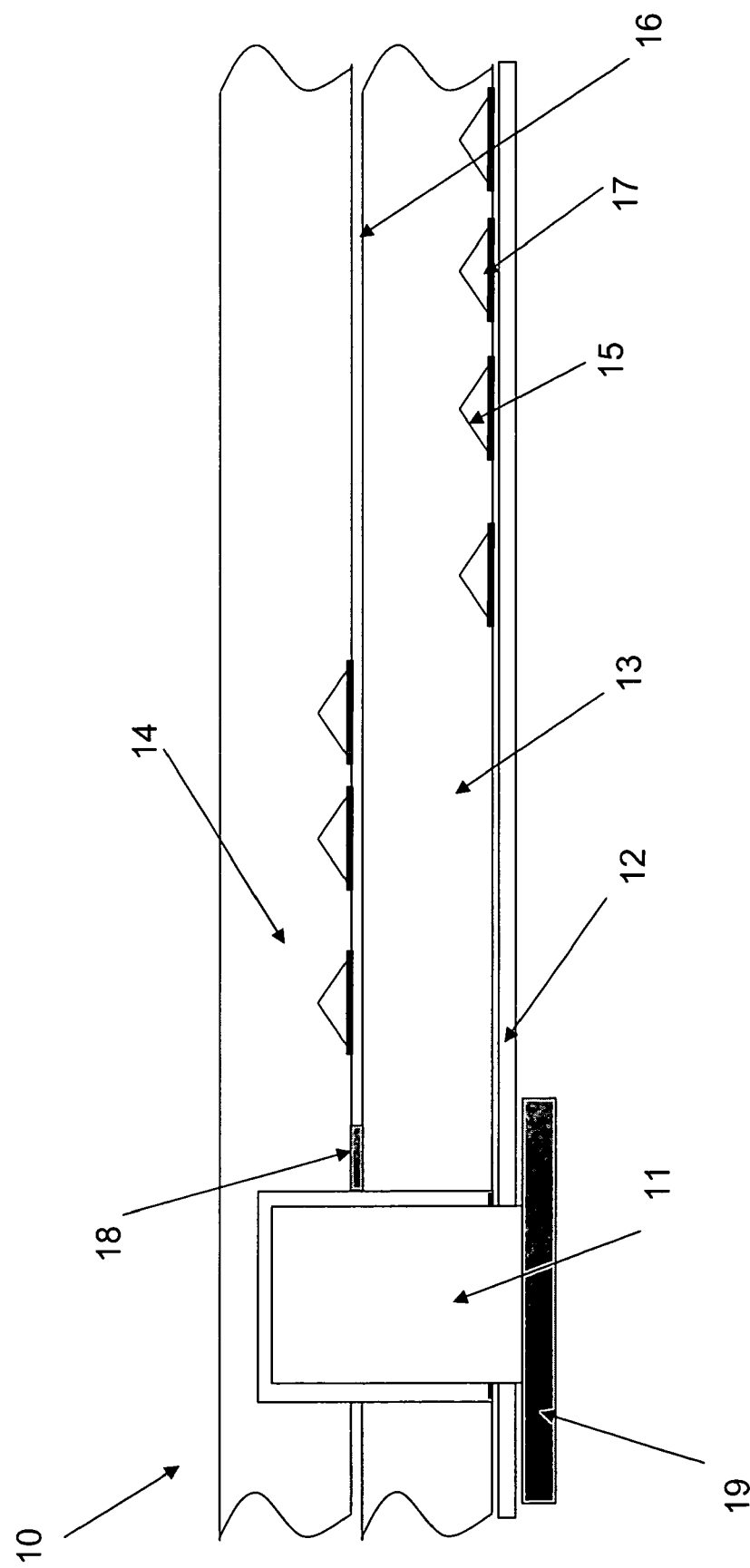
FIG. 1 illustrates a multilayered integrated backlight illumination assembly of the present invention.

The present invention provides an integrated backlight illumination assembly that in some embodiments provide high level of color mixing and light uniformity needed to take advantage of solid-state light sources and in other embodiments are designed for white light illumination. In addition, the present invention significantly reduces the thickness of light guide plates used to spread light over the viewing surface of a display. It is a feature of the present invention to provide a backlight that utilizes a multilayered light film with spreading areas to provide uniform illumination. As used herein, the term "multilayered light film" and "multilayered integrated backlight illumination assembly" is interchangeably used. It is an advantage of the present invention to employ solid-state light sources to provide area backlighting for a display. The apparatus of the present invention is scalable and is particularly adaptable to larger sized LC panels. For example, the present invention provides a backlight apparatus that is well-suited to display applications, particularly for LC display panels, such as those used for LCD TV, medical diagnostics displays, imaging displays, and military displays, for example. In addition, the backlight apparatus of the present invention can be used for other illumination applications where solid-state lighting is advantageous.

Solid State Lighting

Solid state lighting (SSL) refers to a type of lighting that utilizes light-emitting diodes (LEDs), organic light-emitting diodes (OLED), or polymer light-emitting diodes as sources of illumination rather than electrical filaments or gas. The term "solid state" refers to the fact that light in an LED is emitted from a solid object (e.g., a block of semiconductor) rather than from a vacuum or gas tube, as is the case in traditional incandescent light bulbs and fluorescent lamps. Unlike traditional lighting, however, SSL creates visible light with virtually no heat or parasitic energy dissipation. In addition, its solid-state nature provides for greater resistance to shock, vibration, and wear, thereby increasing its lifespan significantly.

Advantages of Solid State Lighting

Energy Efficiency: LEDs have the potential to achieve 90%+ conversion efficiencies as a light source compared to under 50% for conventional sources (a common household light bulb is approximately 9% efficient). Because they are able to convert electricity directly into light, LEDs offer the promise of producing more light than heat from the energy supplied. This has huge implications for energy savings on a global scale in the future. Already, white LEDs are more efficient (measured in lumens/watt-1 m/W) than incandescent sources. Today in applications where color is required, traffic signals or corporate signage for example, SSL is showing substantial reductions in energy consumption as all of the light produced is used, not wasted.

Long Life: The second advantage of LEDs that is revolutionizing the lighting industry is the extremely long life that can be achieved. There are two parts to this story. The first part is referred to as the "useful life", which is application specific. Common understanding is that a lamp lasts a certain amount of time and then goes out. Over the life of the lamp, the light output decreases and eventually the lamp comes to the "end" of its life. LEDs slowly decrease in light output over time as well, however, they never actually reach an "end" to their life in practical terms. For some applications this may be in excess of 100,000 hours where the light level is not critical. For others, it may be 50,000 hours, still approximately 4× better than a common fluorescent and 20× better than a household incandescent lamp. Also, there is no practical end to the life of LEDs. This has important implications for decorative architectural applications and corporate imaging programs. While a burned out lamp can have a damaging impact on aesthetics, the gradual dimming that will occur beyond the useful life of an LED-based system will not have the dramatic negative effect and will not require immediate maintenance.

Robustness: There is no glass or filament to break. LED lighting systems are inherently resistant to vibration problems and can be designed to withstand almost any extreme environment more easily than traditional lighting.

Low Temperature Performance: While there are lamps available that are resistant to low temperatures (metal halide, HPS), others, in particular fluorescent, do not perform well in cold weather. LEDs actually operate more efficiently in colder environments than at room temperature.

Digital Control: As the world goes digital it becomes increasingly important that lighting become integrated into that world. SSL is already a digital system that can be interfaced with other systems or precisely controlled to achieve maximum performance.

Color Saturation and Spectrum: It is possible to program an RGB array to produce almost any color and because light is not being filtered or absorbed the result is a deeper saturation of the color. This also applies to individual LED colors such as red which is produced directly and not by filtering out all of the blue and green present in the light source. In addition an RGB source may also be used with a white light LED light source.

Optical Control: The size of an LED is very small and the light rays it produces are emitted in a very narrow beam. This means that optical systems can be designed to control the light with extremely high efficiency, resulting in less light being required to perform a certain function, which in turn increases the energy efficiency of the system.

Low Voltage Operation: Current SSL systems generally operate on low voltage DC power, making them very safe to install and operate.

Light Redirecting Features

The light films have a pattern of discrete individual optical redirecting features of well defined shape for refracting the incident light distribution such that the distribution of light exiting the films is in a direction more normal to the viewing side of the films. These individual optical redirecting features may be formed preferably between the TIR surfaces (view side and bottom or non-view side), and may include one or more sloping surfaces for refracting the incident light toward a direction normal to the exit surface. These sloping surfaces may for example include a combination of planar and curved surfaces that redirect the light within a desired viewing angle. Also, the curvature of the surfaces, or the ratio of the curved area to the planar area of the individual optical elements as well as the perimeter shapes of the curved and planar surfaces may be varied to tailor the light output distribution of the films, to customize the viewing angle of the display device used in conjunction with the films. In addition, the curvature of the surfaces, or the ratio of the curved area to the planar area of the individual optical elements may be varied to optimize the light uniformity that is directed upwards towards the view side of the backlight or display. Also the size and population of the individual optical redirecting features, as well as the curvature of the surfaces of the individual optical redirecting features may be chosen to produce a more or less diffuse output or to randomize the input light distribution from the light source to produce a softer more diffuse light output distribution while maintaining the output distribution within a specified angular region about the direction normal to the films.

The individual optical elements that form the redirecting features within the light redirecting area of a light film may be randomized in such a way as to eliminate any interference with the pixel spacing of a liquid crystal display. This randomization can include the size, shape, position, depth, orientation, angle or density of the optical elements. This eliminates the need for diffuser layers to defeat moiré and similar effects. Also, at least some of the individual redirecting features may be arranged in groupings across the film, with at least some of the optical elements in each of the groupings having a different size or shape characteristic that collectively produce an average size or shape characteristic for each of the groupings that varies across the films to obtain average characteristic values beyond machining tolerances for any single redirecting feature and to defeat moiré and interference effects with the pixel spacing of a liquid crystal display. In addition, at least some of the individual redirecting features may be oriented at different angles relative to each other for customizing the ability of the films to reorient/redirect light along two different axes.

Additionally, the density of the redirecting features may also vary as a function of their distance form the light source. In general there are fewer features near the light source and more features further from the light source. The relative size of the feature may also vary as a function of the distance from the light source. Smaller features are typically closer to the light source and larger ones further away. This is done to help provide more uniform illumination of the backlight or display.

The angles that the light redirecting surfaces of the individual optical elements make with the light exit surface of the films may also be varied across the display area of a liquid crystal display to tailor the light redirecting function of the films to a light input distribution that is non-uniform across the surface of the light source. The individual optical elements of the light redirecting areas may vary in the size, shape, position and/or orientation of the individual optical elements of the light redirecting films may vary to account for variations in the distribution of light emitted by a light source. The properties and pattern of the optical elements of light redirecting features may also be customized to optimize the light redirecting films for different types of light sources which emit different light distributions, for example, one pattern for single bulb laptops, another pattern for double bulb flat panel displays, and so on.

Further, light redirecting film systems are provided in which the orientation, size, position and/or shape of the individual redirecting features of the light redirecting films are tailored to the light output distribution of a backlight or other light source to reorient or redirect more of the incident light from the backlight within a desired viewing angle. Also, the backlight may include individual redirecting features deformities that collimate light along one axis and the light redirecting films may include individual optical elements that collimate light along another axis perpendicular to the one axis.

In addition the walls of the inner facing feature may have a roughness parameter to aid in the light redirection. Typically a micro roughness is desired versus an optically smooth surface for the redirecting feature in order to provide a more uniform illumination of the redirected light. In an embodiment of this invention the roughness average is between 0.2 to 10 microns and preferably between 0.5 and 5 microns. In another embodiment the optical feature is a cone shape with a smaller dimension of the taper being closer to the view side or light exit side of the optical film or plate. The side wall of the tapered redirecting feature of the cone may comprise at least one angle from the TIR backside side of the optical film. While redirecting features may form an acute apex angle, it may be desirable to have a blunt or flat top on the optical feature. The most useful included angles may be between 20 and 120 degrees. In a preferred embodiment the angles is between 75 and 105 degrees. If the feature has a flat top then the included angle with each side wall may be approximately ½ of the ranges mentioned. The range of angles is for the bulk or principle optical feature in aggregate. In other words, it the flat top and or sides of the optical feature has a secondary optical feature such as a prism, lens or roughness associated with it then it may be possible to quote included angle ranges outside of the ranges quoted above.

Light Extraction Features

There are a number of embodiments for light redirecting features. The basic function of light redirecting features is to redirect light that is otherwise being channeled by TIR and thereby cause light to be emitted from linear light channel or light guide plate (LGP). This can be done in a number of ways, including the following:

(i) Holes or shaped depressions may be formed, molded, pressed and or drilled into the non-view side surface of the film. The redirecting features may be 10 to 500 microns in depth and is somewhat dependant of the thickness of the film. The use of such features may be used with further extraction aid on the top surface of the redirecting film although it should be noted that the light redirecting features may be designed to work in combination with a view side surface feature or optical film. Once the light has been redirected towards the view side surface, other optical films such as diffusers (e.g., volume and or surface, asymmetric, holographic, scattering particles, air voids, etc.). Embodiments within this patent may also be used in combination with at least one film that provides a function selected from the group consisting of diffusion, light collimation, brightness enhancement, light spreading, light bending, forward scattering, back scattering, side scattering polarization, polarization recycling, light modulation, light filtering, stiffening, dimensional stability, layer separation.

(ii) Treatment of the light emission portion of the light film may be done to aid in the extraction of light from the light film. Types of surface treatment include forming light extraction structures along an edge of linear light channel or view surface of a LGP, along the surface that faces the display. For example, one approach is to form an array of prism structures along the length direction. Microstructures used could be an array of prisms, pyramids, hemispheres, or other well-defined geometries to frustrate TIR. These can include top or bottom emitting structures, inverted, formed as individual elements, or aligned in columns. Microstructures could be molded or otherwise formed of varying shapes and sizes, as a function of the distance from the light source.

(iii) Application of a light-extracting film component. One possible light extraction feature that may be used on the light emission portion of the light film is described in commonly assigned U.S. Patent Application No. 20050270798 entitled "Brightness Enhancement Film Using A Linear Arrangement Of Light Concentrators" by Lee et al., incorporated herein by reference. Optionally, the light emissive surface of a portion of the light films may be featured to form light extraction structures thereon. A portion of light film can be molded such as using a roller or otherwise treated to form light-redirecting microstructures.

(iv) Printed dots. A pattern of reflective dots, printed along a base portion of light film opposite its light emission surface, can be used to redirect light upwards towards the view side. Printed dots can be of varying density and size, helping to provide a more uniform light output.

Combinations of these types of treatments listed in (i) through (iv) above could also be used. Light extraction features could be individual elements. In order to provide uniform light emission along the length of light film, the size and density of the light extraction area may vary as a function of the distance from solid-state light source. For example, where there are LED light sources at each end of featured portion of the light film, light redirecting features could be distributed with higher density near the center than toward the ends. Alternately, the distribution density of light extraction elements could be substantially continuous in one direction. Light redirecting features may be molded into, embossed, pressed, adhered, or laminated to the side of the light film that faces the display plane or other light output side.

For some embodiments useful in this invention the light extraction feature may be used in localized regions and may be used to diffuse hot spots. Whether the light source is a side emitting or top emitting light source, the output surface is somewhat hemispherical and may project light at a variety of angles. The object is to eliminate or minimize hot spots or overall bright areas of illumination. The light extraction or light spreading features allows some light to project towards the viewer while taking other parts of the light and projecting it at angles so as to create less bright spots. Means of achieving this may include optical feature that help to turn light. The features may substantially over the light source and may be in combination a secondary means of light diffusion. Both means may be in pattern that of the hot spots and the relative amount of diffusion may form a gradient based on the light intensity of the hot spot.

Film Materials

Typically, it is desirable to have a highly transparent material that is free of defects and is substantially non-color changing based on age and or environmental exposure. Additives may be included to minimize any physical, chemical or optical change in the film over a wide range of conditions. The film should have a percent transmission of greater than 85% and preferably greater than 90%. Another desirable attribute of the film is to provide good dimensional stability over the specified range of temperature and humidity for a variety of display applications. Useful material may include but are not limited to polycarbonate, PMMA, impacted modified PMMAs, light or chemically cured acrylates, polyesters, cyclic olefins, polyestercarbonates, polysulfones and copolymer derivates thereof. Films made from some of these or other materials may be cast with no orientations or may also be oriented in at least one direction to improve dimensional stability. The cast polymer may also be coated (extruded) or otherwise placed on a separate film that has the desired properties or may help to augment the properties on a cast film.

Monitoring Color Shifts

One well-known problem with LEDs and other types of solid-state light sources relates to spectral stability and accuracy, which can cause some amount of color shifting. An optional color sensor can be provided as a component of one or more of the light film extraction areas. Color sensor can be used in a control loop that compensates for color shifts such as can be due to age, heat, or manufacturing differences between LEDs or other types of light source. Optionally, image data for pixels nearest a particular light pipe can be adjusted to compensate for detected color shifts.

System Considerations

Using any of a number of devices currently available, light films of the present invention are capable of providing a high level of illumination, at between 2000-6000 nits or higher. At high energy levels, heat buildup can be a problem with LEDs in some applications. Backlight apparatus can provide one or more heat sinks, cooling fans, or other mechanisms to help dissipate excess heat during operation. Advantageously, heat-dissipating components can be positioned along peripheral edges of a display device, away from the LCD panel when using the apparatus and methods of the present invention.

Referring now to the drawings, FIG. 1 provides a multilayered light film 10 that has a solid state light source 11 that illuminates a "primary" film layer 13 as well as a "secondary" film layer 14. The light source passes through the bottom film layer 13 and partly into the top film layer 14. In another embodiment the light source could pass through both films. An adhesive pad 18 may be used to help provide a standoff effect by creating an air layer 16 between the films. Since LED's tend to generate heat, it may be desirable to have a heat sink 19 associated with each light source. The light extraction features 15 may be offset from one film to the other. The light redirecting features in one embodiment provides an air pocket 17 by forming a feature that is between the upper and lower TIR surface of films 13 and 14. The multilayered light film 10 also has a reflector 12 located on the bottom of the multilayered light film 10. The films may be laid on top of one another so as to provide or trap an air layer 16 between the two films. A layer of adhesive 18 improves the optical efficiency by increasing the light coupling efficiency with sufficient large light input surface, which is the total thickness of the stacked up films and by increasing the light extracting efficiency by reducing the thickness of each light guide film so that more light can hit the light redirecting features on the light guide film. Further, improvements in the light spatial uniformity are achieved by reducing the light redirecting area in each film. Also, improvements in manufacturing feasibility are achieved by reducing the thickness of each film to maintain the flexibility of the film in the manufacturing process.

For this and other embodiments within this disclosure there are at least two light guide films stacked together and each film has light redirecting features are on each light guide films. An air gap between light guide films enhances the total internal reflection (TIR) on the surface of light guide film so that the light can be reflecting between the surfaces of the light guide film and travel along the light guide film before the light hits the light redirecting features on the surface of light guide film. The spacing between light guide films is minimized, especially on the light input surface in order to minimize the light trapped in the air gap. Furthermore, the light redirecting features on different light guide films in the stack can be located in different areas on the display area to provide spatially uniform light output. In other words, there is no overlap between the light redirecting features on the stacked light guide films. Also, there can be overlap between the light redirecting features on the stacked light guide films to provide spatially uniform light output.

Note, although an adhesive is utilized in this embodiment to bind the light guide films together, the present invention is not so limited. For example, other binding means for binding the films include, ultrasonic tacking or welding, laser assisted spot welding or tacking (may be further enhanced with a IR absorbing die), flame treatment of the edges, solvent welding (via a spot tack or application to the edge), spot tacking using hot glue on the edge ("book binding"), edge or spot crimping or compression, pins, post and hole, screws between two tension members. The area close to the light input surface is favored for adhesion, because this can ensure the minimum air gap between films in the input surface in order to minimize the light transmitted into the air gap between films on the light input surface. The LED can go through holes on the light guide films. For the film on the top of the stack, the hole can be a through hole, cave or pocket with the cover on top. The heat sink is useful to help pull heat away from the LED, and provide longer life.

Preferably, films 13, 14 have a bending stiffness between 50 to 1200 millinewtons. More preferably, between 150 to 400 millinewtons. Stiffness below 50 millinewtons is difficult to handle and place into a display. Stiffness above 1200 millinewtons is difficult to bend around rollers required in a roll to roll manufacturing process. The bending stiffness of the film or bar is measured by using the Lorentzen and Wettre stiffness tester, Model 16D. The output from this instrument is force, in millinewtons, required to bend the cantilevered, unclasped end of a sample 20 mm long and 38.1 mm wide at an angle of 15 degrees from the unloaded position Preferably, for each of the films 13, 14, the thickness is between 0.1 mm to 1.0 mm. More preferably, the thickness is between 0.1 mm to 0.8 mm. Accordingly, the thickness of the multilayered light film 10, having films 13, 14, has a thickness between 0.2 mm to 2.0 mm. More preferably, the thickness of the multilayered light film 10, having films 13, 14, has a thickness between 0.2 mm to 1.6 mm. The thickness of the film is related to the emitting surface of the desired light source. It is desirable to have the thickness of the film at least match the thickness of the emission surface of the light source and preferably the thickness of the film is approximately twice as thick as the emission surface of the light source. In addition, the light guide film of the present invention has a width to height ratio of between 10/1 to 1000/1.

Figure 2:
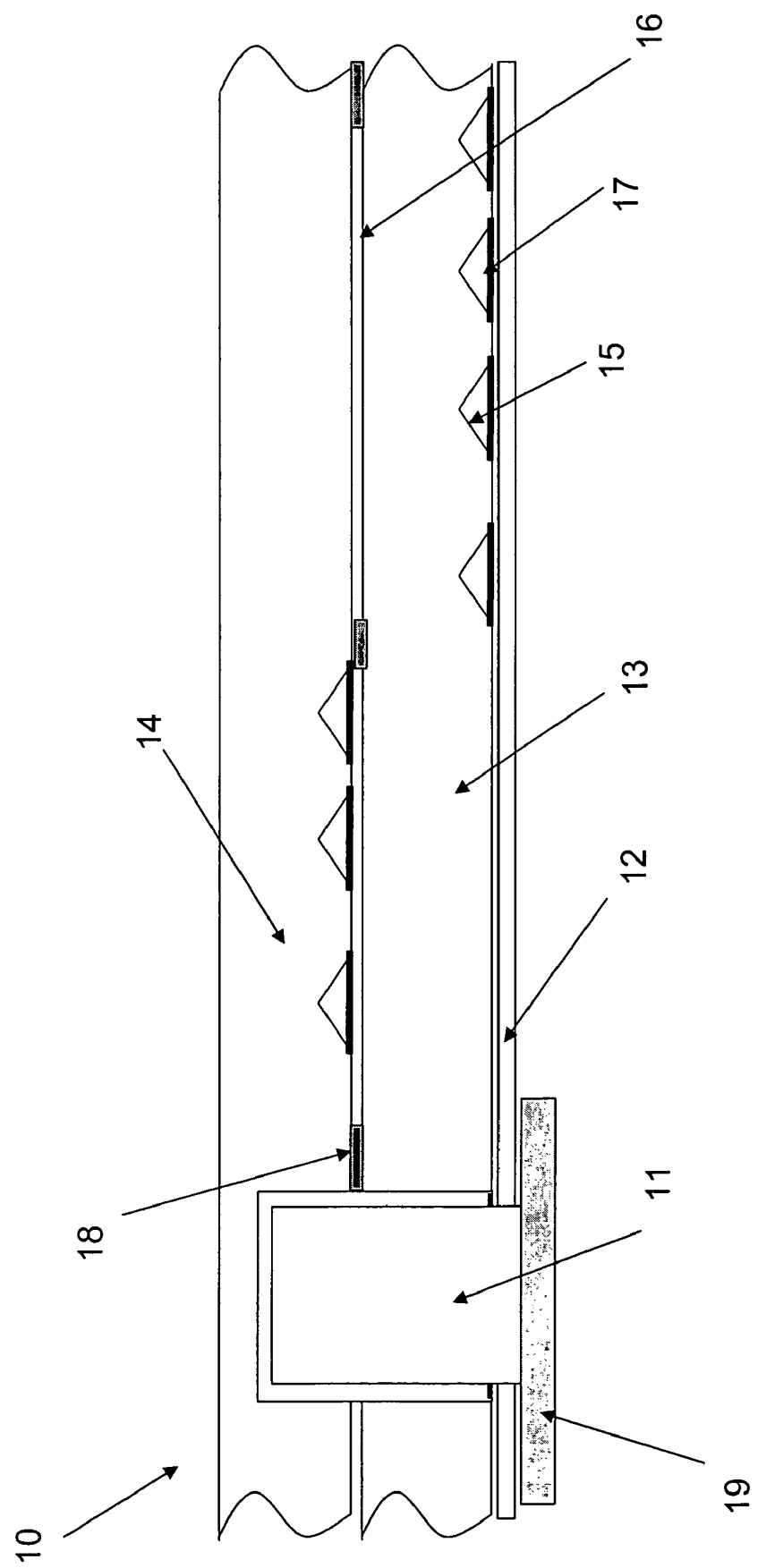
FIG. 2 illustrates another embodiment of the multilayered integrated backlight illumination assembly of the present invention.

FIG. 2 illustrates another embodiment of the multilayered integrated film 10 of the present invention having multiple adhesive pads 18 that are provided for a more uniform airgap 16 over the entire length of the films 13, 14. Such an embodiment provides an optimum design for improved light uniformity. Note, the adhesive may be patterned. In other embodiments, the adhesive pad 18 may be a polymer layer with little or no adhesive property and act as a standoff.

Figure 3:
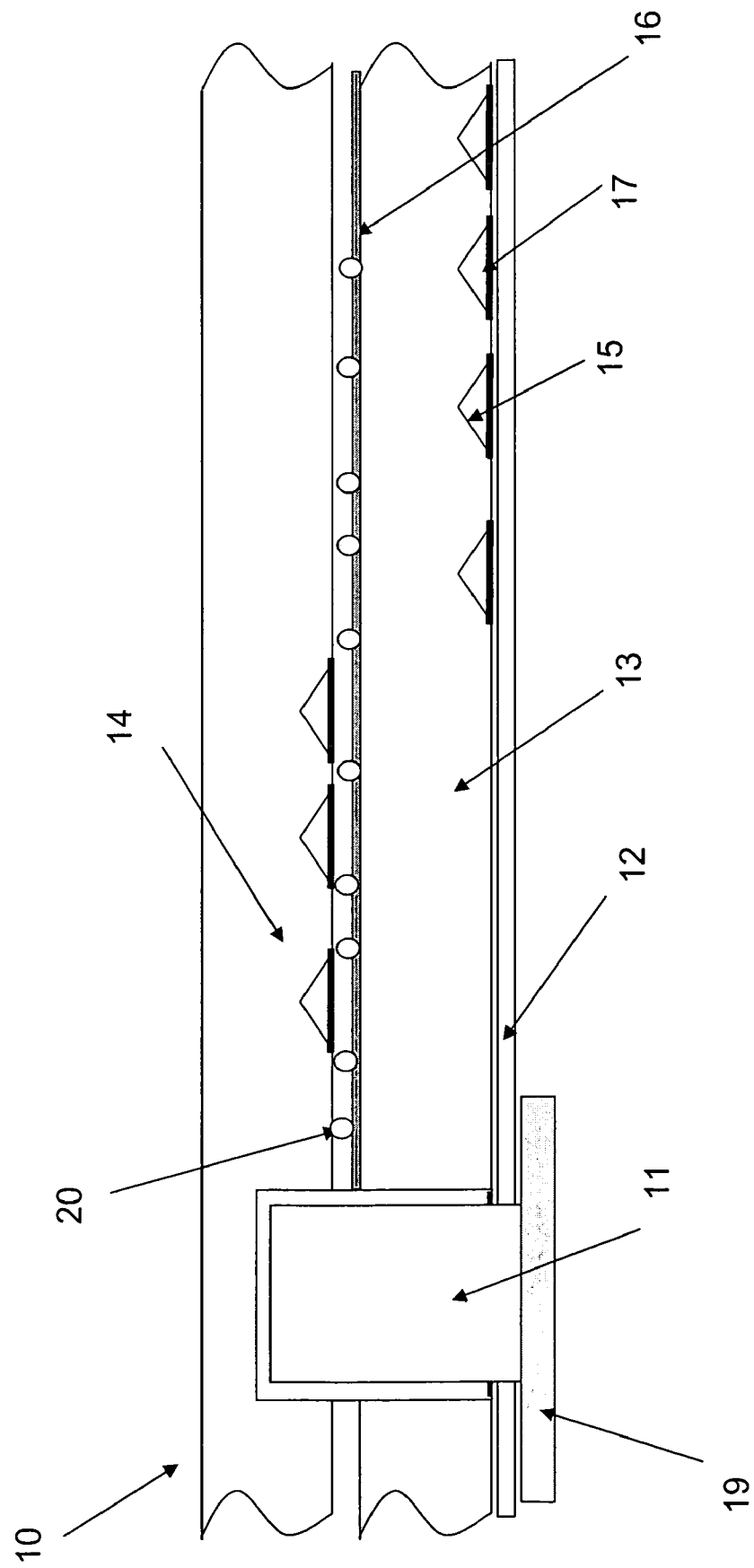
FIG. 3 illustrates another embodiment of the multilayered integrated backlight illumination assembly of the present invention.

FIG. 3 illustrates another embodiment of the multilayered integrated film 10 of the present invention having a polymer layer 16 with beads 20 applied to at least one film of the multilayered light film 10. Such a layer provides control over the airgap between the film and may be adjusted base upon the size of the beads or particles 20. To provide the best optical performance it may be desirable to provide polymer layer 16 and beads 20 with a refractive index substantially similar to that of the films 13 and 14. The bead concentration may also be adjusted to minimize scattering. In a further embodiment of this invention the beads could provide some scattering and diffusion.

FIGS. 4A and 4B provide a cross sectional view of a multilayered light film that has a solid state light sources 11, 21 on each end of the light redirecting areas of the films 13, 14. FIG. 4A has LED 11 (white light) on one end that passes through both films 13 and 14 and may have an optical means of light block 22 so as to prevent white light from entering one end of the film. In another embodiment the LED may pass through the lower film 13 and only have its emitting surface within the thickness plane of film 14. In such an embodiment, optional light block 22 is not needed. On the other end of the multilayered light film an RGB light source 21 may be present to provide light into one of the films. It may be either the top or bottom or between the white light illuminated film in an embodiment having more than two films. Note, the multilayered light film may further comprise a trichromatic sensor to correct or adjust both the luminance and color of the light source. While not shown, a three layer film could also be provided in which two layers of RGB are on each side of a white LED illuminated film. In such an embodiment, it may be possible to provide a display with dynamic color and dynamic dimming that is further enhanced by a light source.

For example, independent control of white LED and solid state RGB light sources is possible. Bottom film light redirecting area has a color mix section to achieve white if desired. White LED has dynamic dimming and can be turned on/off to modulate the light intensity. The color LED may be controlled for one or more colors. Note, while this embodiment illustrates the white light source in the top and the color in the bottom, the configuration may be reversed or there may be at least two RBG light sources on each end that may emit into one or more film layers. In another embodiment, the light LED can be fired from one end in at least two layers and the RGB LED can be fired into at least one or more layers. The advantage is to provide an expanded color gamut with improved contrast for all colors. These capabilities in combination with dynamic dimming, is helpful to provide light control to various areas of the display. Such display may be either active or passive matrix to provide unique lighting effects or it may also have general light applications. The dynamic color control and the dynamic dimming may be applied to each individual light source or there may be one or more light sources that are group together and controlled by a single driver.

FIG. 4B is a multilayered light film with white LED light sources 11 provided on each end of the light redirecting areas. The multilayered light film may be lit from either one or both ends. This embodiment is useful for a display with multiple light redirecting regions depending on where they are located in relation to the edges. If lit from one end, the light source may be hidden under the frame or edge bezel.

Figure 5:
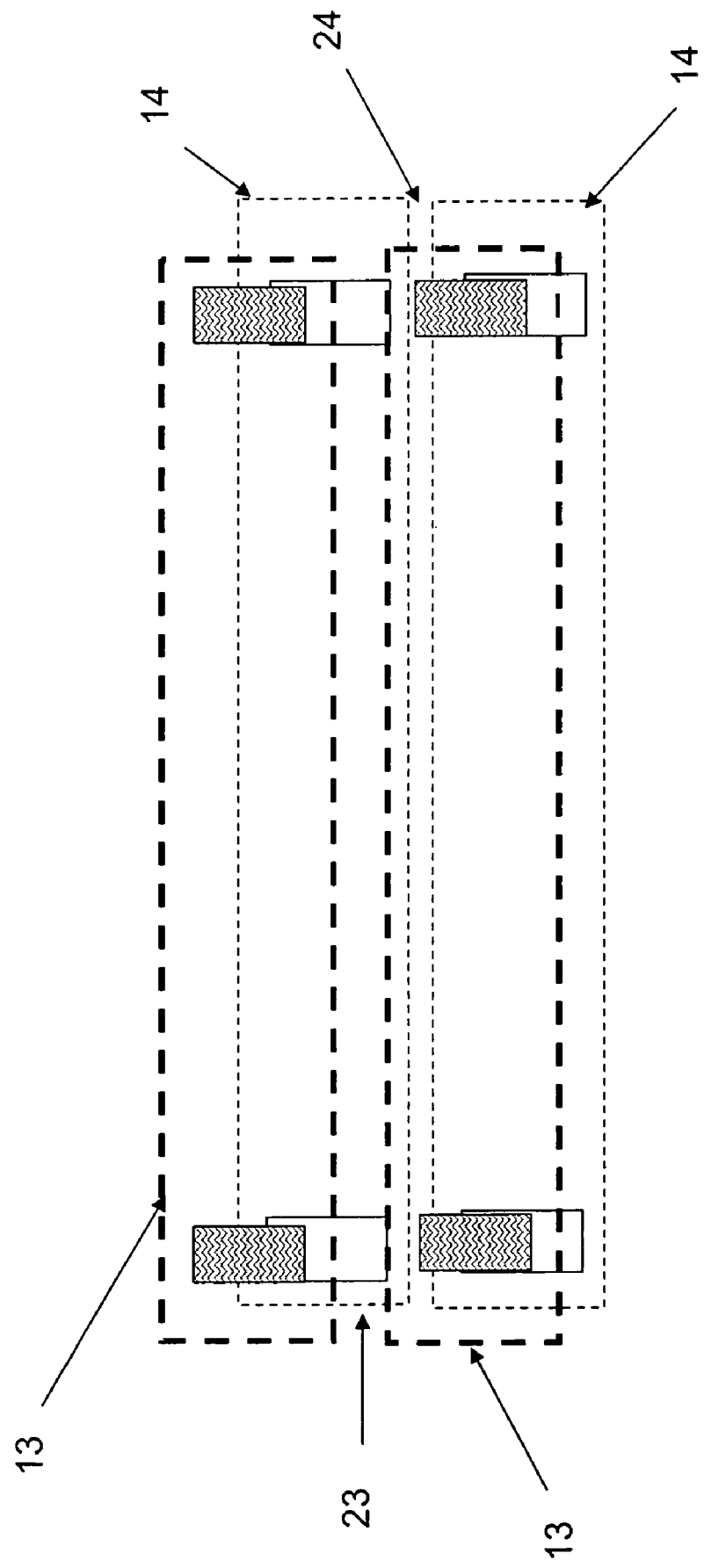
FIG. 5 illustrates another embodiment of the multilayered integrated backlight illumination assembly of the present invention.

FIG. 5 is an embodiment of a multilayered light film with light redirecting regions where either the top or bottom light redirecting regions are offset from one another. Such embodiment is useful in providing a more uniform light emitting surface. If there is a channel or space between light redirecting areas in the bottom layer to prevent cross talk, the top film with light redirecting areas can be offset so as to cover or hide the air gap betweens the light redirecting areas of the bottom film while the bottom film would have an illumination profile that would project light through the gap or void between light redirecting areas of the top film. Bottom films 13 as shown by the dotted line region and channel 23 (through-hole or partial trench) that separates light redirecting regions to minimize light leakage between the areas and top films 14 with channel 24 form a multilayered light film. Channel 23 is offset from channel 24. In this manner, there is at least one layer of light redirecting film over the channel 23 of the bottom film, to improve light uniformity. Overall, there is improved uniformity before the light enters a diffuser layer that is positioned above the light films. A higher brightness diffuser could then be used to allow more light into other films or the LCD of a display.

FIG. 6A is an end view of a offset or staggered multilayered light film and 6B is a perspective view of the same. In FIG. 6A, light films 13 and 14 have the light source 11 only in their respective layer. The channel 23 or partial trench 24 is provided in films 13, 14, respectively. In this embodiment, the top film light source 11 and film are offset to help to hide channel 23 and provide more uniform illumination. FIG. 6B is a perspective view but has LED 11 in both the top film 14 and bottom film 13. Again, the top and bottom films 13, 14 are offset. In this embodiment, the top channel is shown with a through channel but another embodiment would have a trench or channel that only partly goes through the film.

Figure 7:
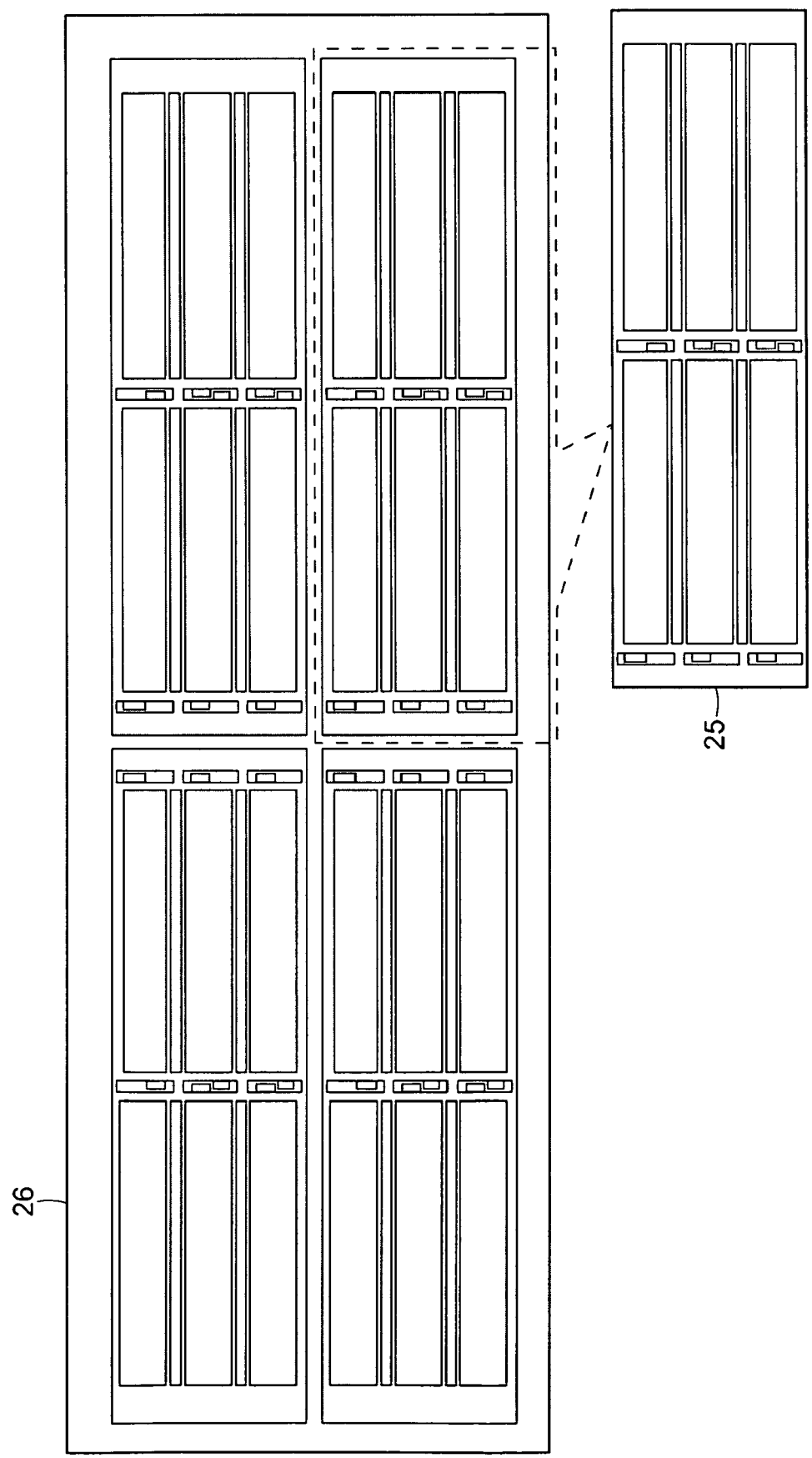
FIG. 7 illustrates another embodiment of the multilayered integrated backlight illumination assembly of the present invention.

FIG. 7 is a top view of a tiled display 26 made from several modular multilayered light redirecting film 25 that provides a two layer film to help spread light over wider areas for a wide screen display application. The modular approach provides an efficient means to manufacture a small module and then tile them together to form a larger display. In this manner, the modular film 25 can be tiled together to form displays of different sizes depending on the number of modules tiled together.

Figure 8:
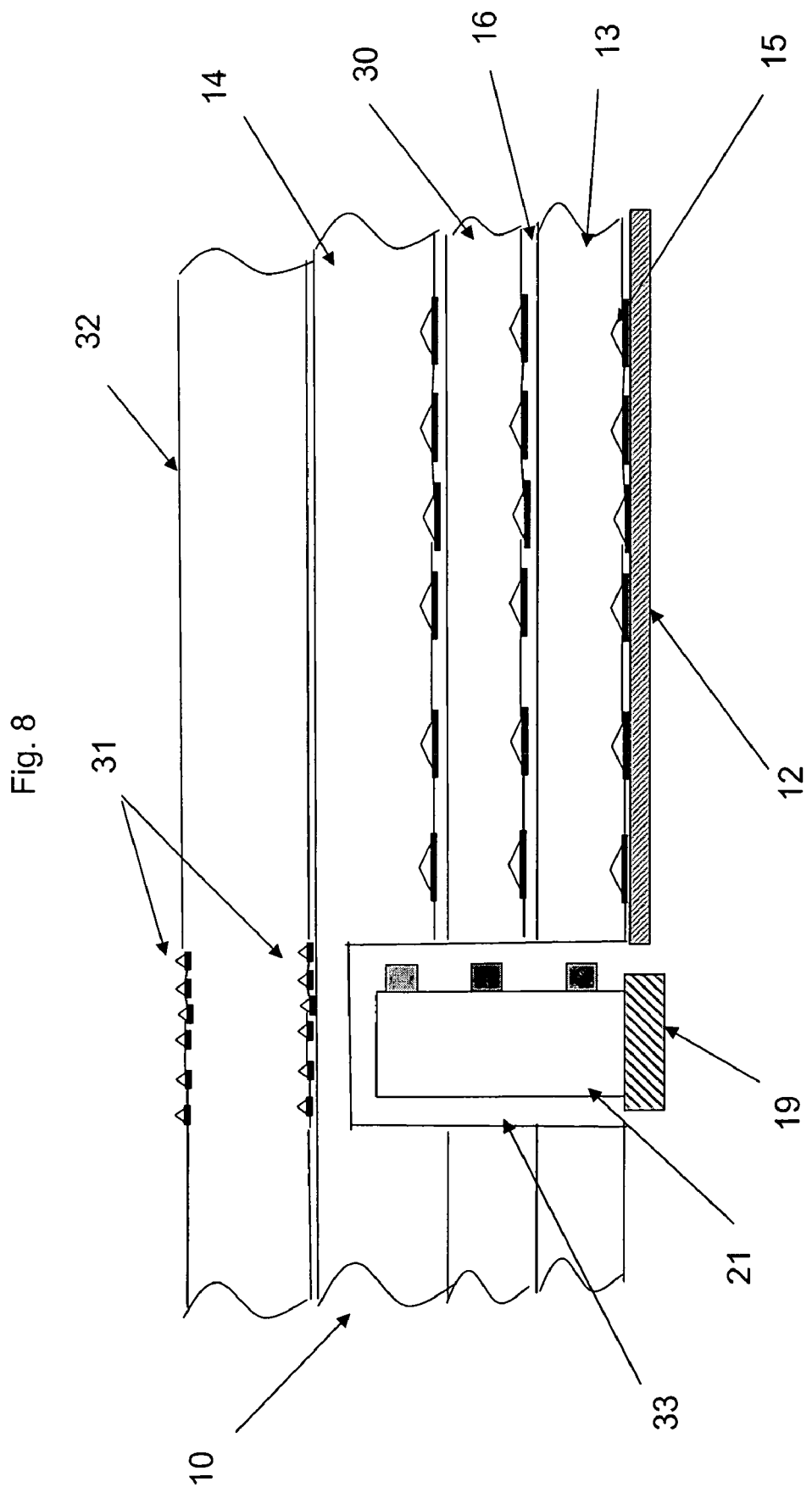
FIG. 8 illustrates another embodiment of the multilayered integrated backlight illumination assembly of the present invention.

FIG. 8 is a side view of a multilayered light film 10 with a solid state RGB light 21 source illuminating separate layers 13, 30 and 14, one each for red, green and blue, respectively. The stack order of the RGB colors may be in combination of top, middle or bottom. Each film has a series of light redirecting features 15 that may be optimize for the specific wavelength of light. The size, geometry, depth and density may be varied as desired to optimize light uniformity. Also, the solid state light source may be driven together or separately. Note, in this embodiment, color mixing is achieved in the vertical plane. Heat sink 19 is used to minimize heat buildup and help assure better performance. Bottom reflector 12 helps to redirect light back into the film and towards the viewer. Optical features 31 on optical film 32 may be used to reduce any bright spots coming from LED 21. Optical film may also have a second optical feature on the view side surface to help further scatter light and improve the overall lighting intensity and overall uniformity. It is desirable to provide a film in which the optical features are substantially aligned to cover the solid state light source as well as the cavity in which the light source is inserted. The optical pattern may extend beyond the cavity or hole in the film. It should also be noted that the cavity may also extend through the film so as to form a hole. In such an embodiment, one advantage is to provide a means of heat venting to minimize heat buildup that may impact the performance of the light source. The film is preferably transparent and is substantially index matched to the other light films. In another embodiment, film 32 may comprise a means of diffusion. The diffusion may be either surface and or bulk. The diffusion may be achieved with particles, beads or voids. The surface may be coated with a layer of pigments or beads to further aid in the optical manipulation of light. Also, while not shown, film 32 may comprise more than one layer. For instance, the film may be coextruded or co-injection molded to more than one layer. Each layer may have a different functionality (optically and or physically). Other means known in the art may also be used to achieve this effect.

Figure 9:
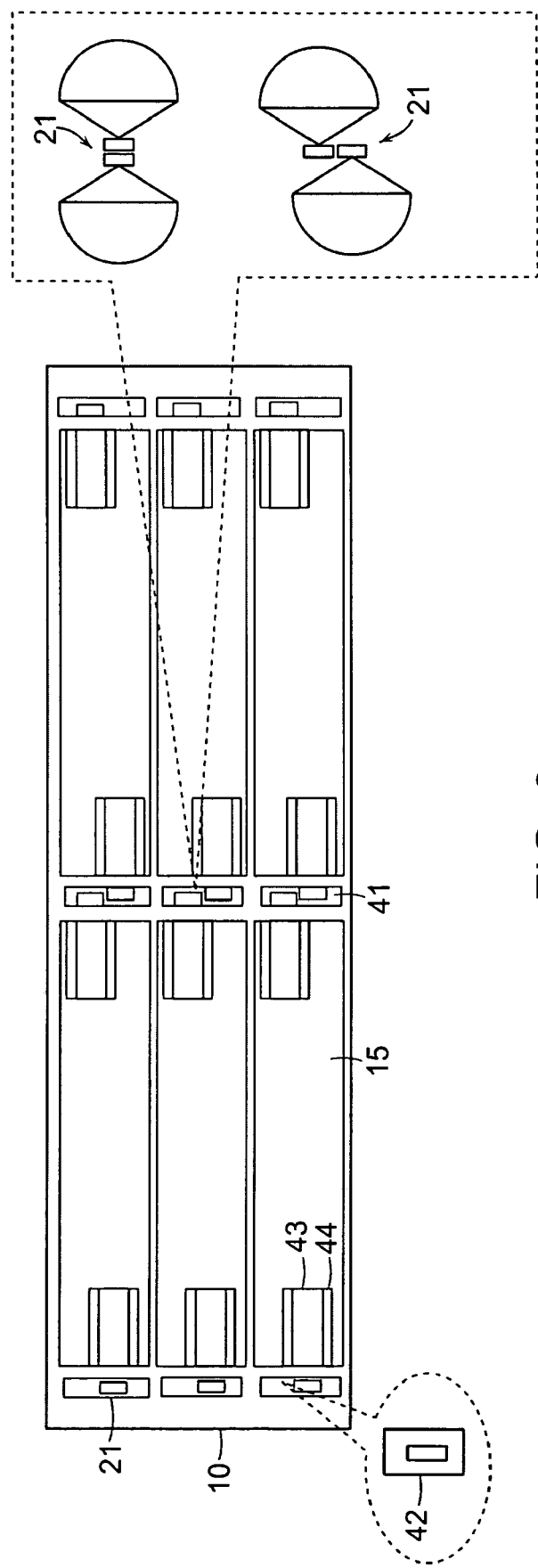
FIG. 9 illustrates another embodiment of the multilayered integrated backlight illumination assembly of the present invention.

FIG. 9 is a top view of a multilayered light film 10 having a color mix section 43 within at least one film to aid in the mixing of RGB light input or LED 21 within a given channel. It should also be noted the light sources may be inputted from two ends of the light film and the color mix sections 43 may be offset or otherwise staggered. Such an embodiment may allow for better light distribution and uniformity. FIG. 9 further shows a hole 41 in which the LED 21 is inserted and may be designed in a manner to accommodate more than one LED 21 per hole or cavity. The LEDs 21 may be arranged in a back to back or a side-by-side configuration.

FIG. 10A is a cross-sectional view of a multilayered light film 10 with a variety of pocket, trench or through hole 33 designs that could be used to house the solid state light source. Within a given multilayered light film there may be at least one pocket or trench shape. While there may be more than one design within a given multilayered light film, this figure should not imply that all these shapes would be used in a single film. It simply is drawn to show that a variety of shapes can be used. Different shapes will have a slightly different foot print that is useful in controlling light uniformity.

FIG. 10B is a multilayer light film 10 with two different light cavities. One is a continuous trench 34 while the other is cavity or pocket 33. The continuous trench 34 provides an advantage in the manufacturing and assembly of the backlight 35 while the individual pocket has advantages in providing a different light uniformity profile.

Figure 11:
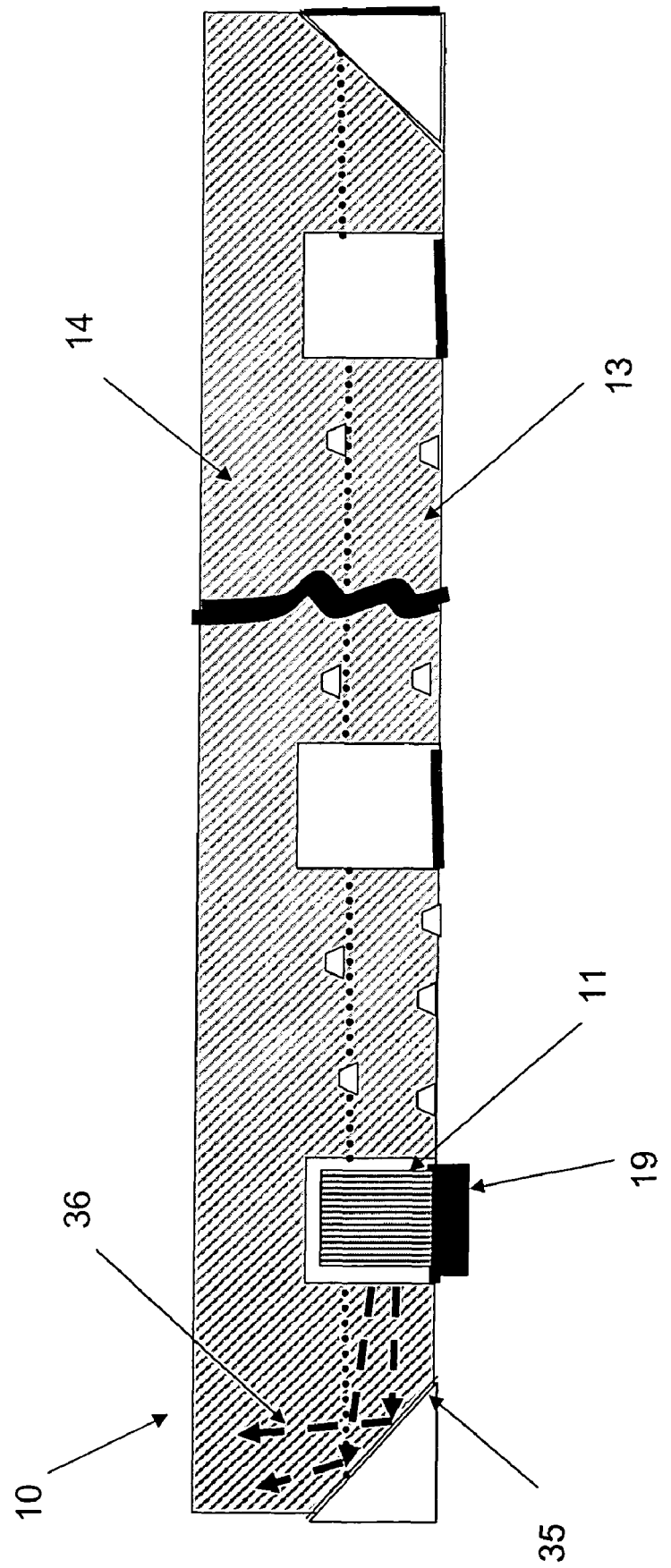
FIG. 11 illustrates another embodiment of the multilayered integrated backlight illumination assembly of the present invention.

FIG. 11 is a multilayered light film 10 with bottom film 13 and top film 14 and LED 11 and its associated heat sink 19. The edges 35 of the light film have been tapered or otherwise beveled to aid in the redirection of light ray 36 towards the top or view-side surface. Embodiments with a beveled edge provide a more uniform illumination particular on the edges of the backlight or display.

Figure 12:
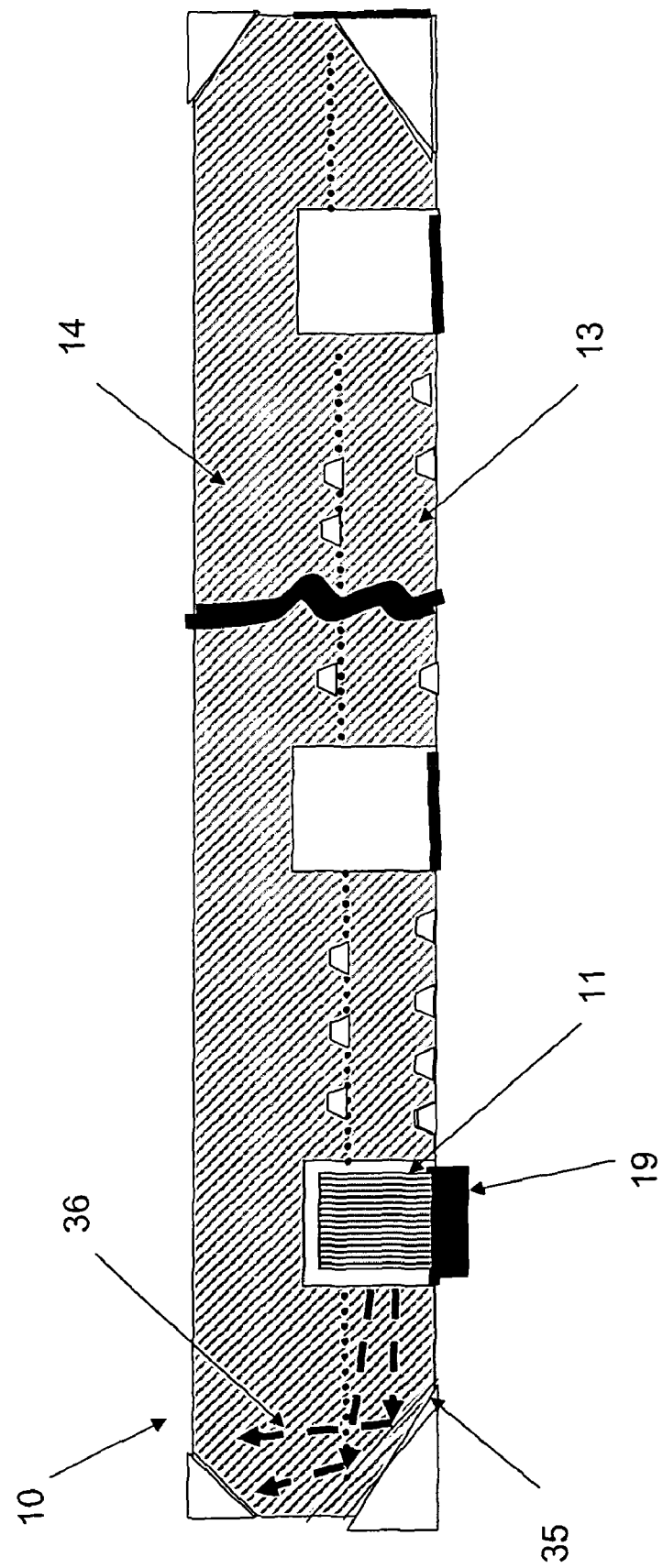
FIG. 12 illustrates another embodiment of the multilayered integrated backlight illumination assembly of the present invention.

FIG. 12 is a multilayered light film 10 with bottom film 13 and top film 14 and LED 11 and its associated heat sink 19. The edges 35 of the light film have been tapered or otherwise beveled to aid in the redirection of light ray 36 towards the top or view-side surface. Here, multiple edges 35 are beveled. Embodiments with a beveled edge provide a more uniform illumination particular on the edges of the backlight or display.

Figure 13:
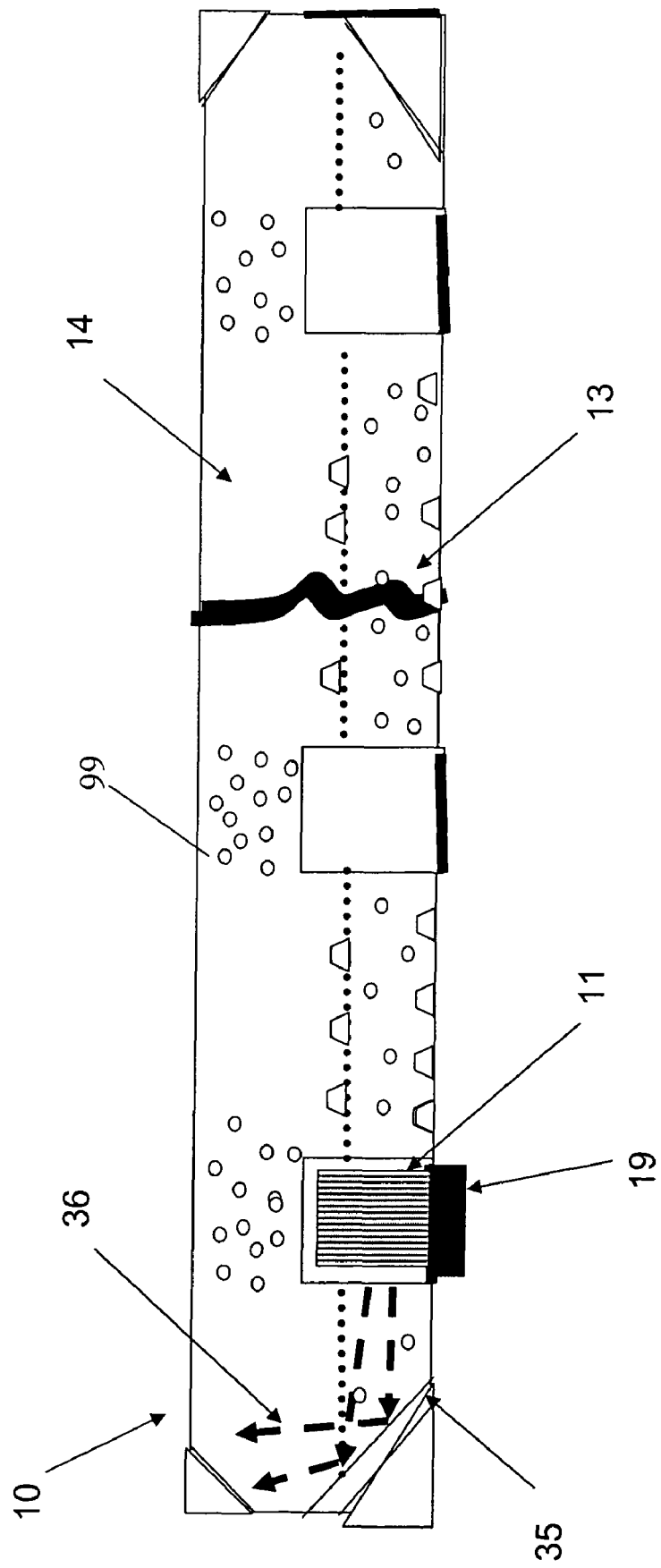
FIG. 13 illustrates another embodiment of the multilayered integrated backlight illumination assembly of the present invention.

FIG. 13 is a multilayered light film 10 with bottom film 13 and top film 14 and LED 11 and its associated heat sink 19. The edges 35 of the light film have been tapered or otherwise beveled to aid in the redirection of light ray 36 towards the top or view-side surface. It is noted that there are additional small particles or cavities 99 within at least one film to further aid in the redirection of light. The particles or cavities may be in either or both film layers 13 and 14. In another embodiment, the particles or cavities may be patterned above the light source in a manner to help scattering or other redirect light so as to spread it our and minimize bright spots. In a preferred embodiment, the particles 99 are organic and are substantially forward scattering. Note, the present invention may be used in combination with at least one film that provides the following functions, including, diffusion, light collimation, brightness enhancement, light spreading, light bending, forward scattering, back scattering, side scattering polarization, polarization recycling, light modulation, light filtering, stiffening, dimensional stability, layer separation.

FIG. 14A is a multilayered light film 10 with bottom film 13 and top film 14 (Other embodiments may include more than two layers) and LED 11 and its associated heat sink 19. The edges of the light film have been tapered or otherwise beveled to aid in the redirection of light ray 36 towards the top or view-side surface. A diffuser film 50 with a second patterned diffuser area 51 may be positioned on the exit side of the light film layer 14. The advantage of having a second diffuser area above the light source is that area may be adjusted in its diffusion properties to minimize bright areas substantially above the light source. It should also be noted that the diffusion film 50 may be a volume diffuser or surface diffuser and may also have some asymmetric properties. The diffusion may be obtained by particles, beads, air voids or other means known in the art or a combination thereof. The diffusion area 51 may have a slightly wider footprint than the LED and its associated hole or cavity.

FIG. 14B is another embodiment, similar to FIG. 14A, but having beads, particles or a pattern of roughness has been positioned above the light hole or cavity. In such a manner, an added layer of air is provided to further aid in the diffusion of light above the lights to aid in developing a uniform light profile.

FIG. 15A is another embodiment of a multilayered light film 10 having a diffuser 50 in placed on top of the light film. The diffuser 50 is useful in helping to provide more uniform light across its emitting surface.

FIG. 15B is another embodiment having an optical structure 53 is formed on at least one side and above the light source. The optical structure 53 is useful in reducing light to minimize bright spots from the light source by directing light over a wider footprint. Such an optical structure may spread light substantially in all forward direction or predominately more in one direction than others. The optical structure 53 may comprise any shape or combination of shapes to provide substantially uniform light across the backlight. The height profile of the structure may be uniform or it may vary and the density may also vary to accommodate bright spots. A variety of multi-dimensional shapes may be used including lenslets, triangular, curves or changing slopes and others. Roughening of the surface may also be used. The optical feature may project beyond the surface of film 14 and or may project inward. In either case there are regions of material such as polymers, organic and inorganic materials, and air.

FIG. 16 is a top view of a tiled display 26 made from several modular multilayered light redirecting film 25 that provides a layered film to help spread light over a wider area for a wide screen display application. In both the horizontal and vertical planes there may be a region 61 over the LEDs as well as between modules that may have a different light intensity profile than the area over the light redirecting area. FIG. 16B provides a region with more uniform lighting. The redirecting region may be substantially vertical features 63 or angled or other sloped features 62 to provide light in a controlled off-axis delivery to the exit surface. In this manner, the region between modules can be provided with more uniform lighting, reducing bright spots. The modular approach provides an efficient means to manufacture a small module and then tile them together to form a larger display. In this manner, the modular film can be tiled together to form display of different sizes depending on the number of modules tiled together. By designing the light redirecting features to provide some off-axis light to the region between modules a more pleasing backlight can be provided.

Figure 17:
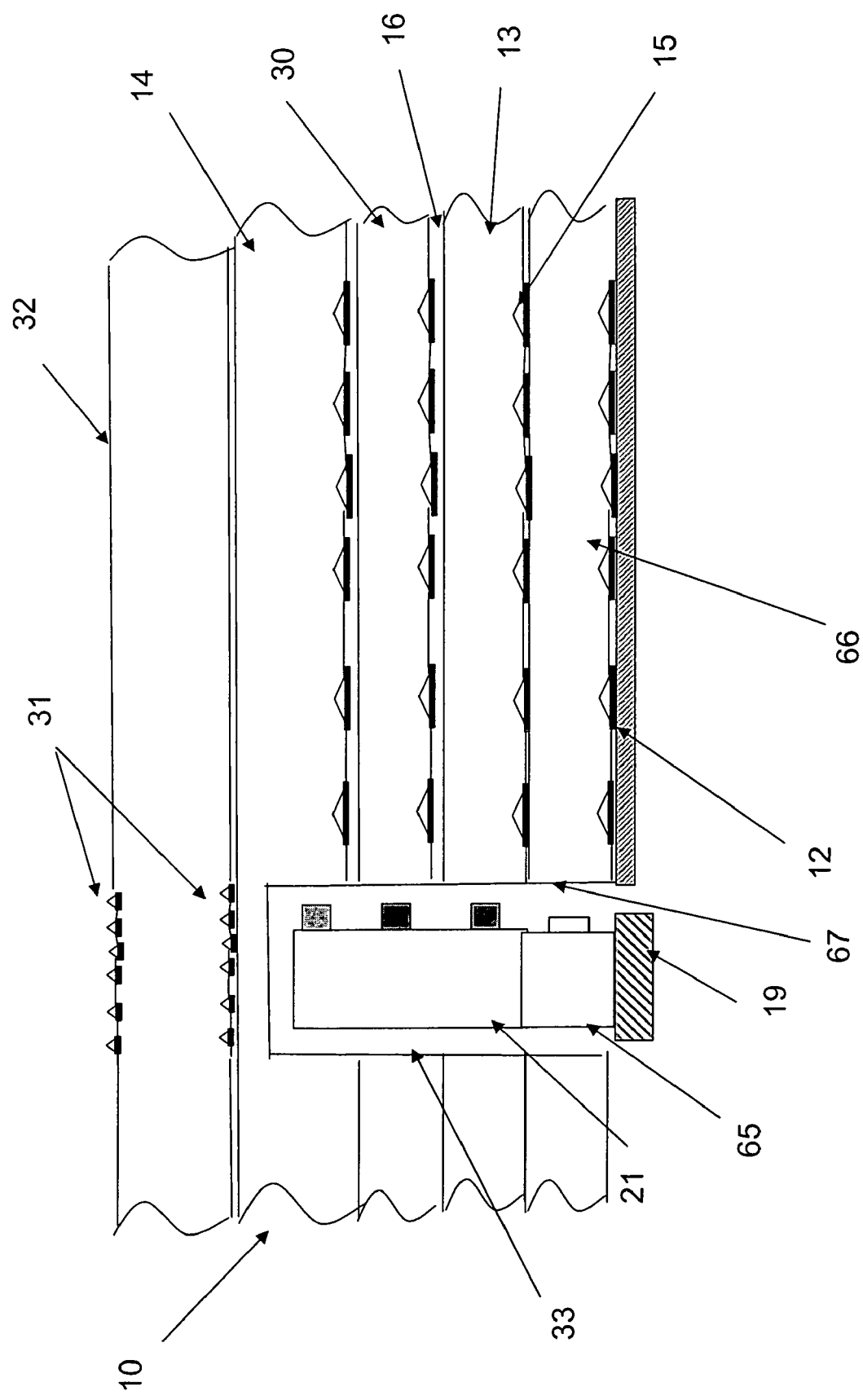
FIG. 17 illustrates another embodiment of the multilayered integrated backlight illumination assembly of the present invention.

FIG. 17 is a multilayered light film 10 with substantially separate layers of a white light source 65 emitting into layer 66 and RGB light source(s) 21 emitting into layers 13, 30 and 14 respectively. The white and RGB light sources may be stacked in any combination. While this figure shows the light sources occupying the same hole or cavity 33, other embodiments may provide these light sources in separate holes of cavities 33. Additionally, it is noted that the light sources may be configured in a manner to emit light in more than one direction. In one embodiment the light emitting surface of the light source should be smaller than the thickness of the individual light layer. The ratio height of the light source to the input surface may be between 0.75/1 to 0.1/1. If a lens or other optical structure is provided on the light input surface 67, the above ratio may be changed to obtain a much higher light input efficiency. The light sources may be driven in a variety of combinations, including, all on, all off, any number in any combination on or off as well as providing a signal which can be modulated to vary the intensity of the light sources to any one or all of the light sources. The heat sink 19 may be attached to a source to help conduct heat away from the light source. Additionally, a means of circulating a gas or liquid in or around the light sources or heat sink may be utilized to control heat in the backlight. Note, while this embodiment is described as light or waveguide film or layers, an additional embodiment may use one or more light guide layers with one or more light guide plates.

Figure 18:
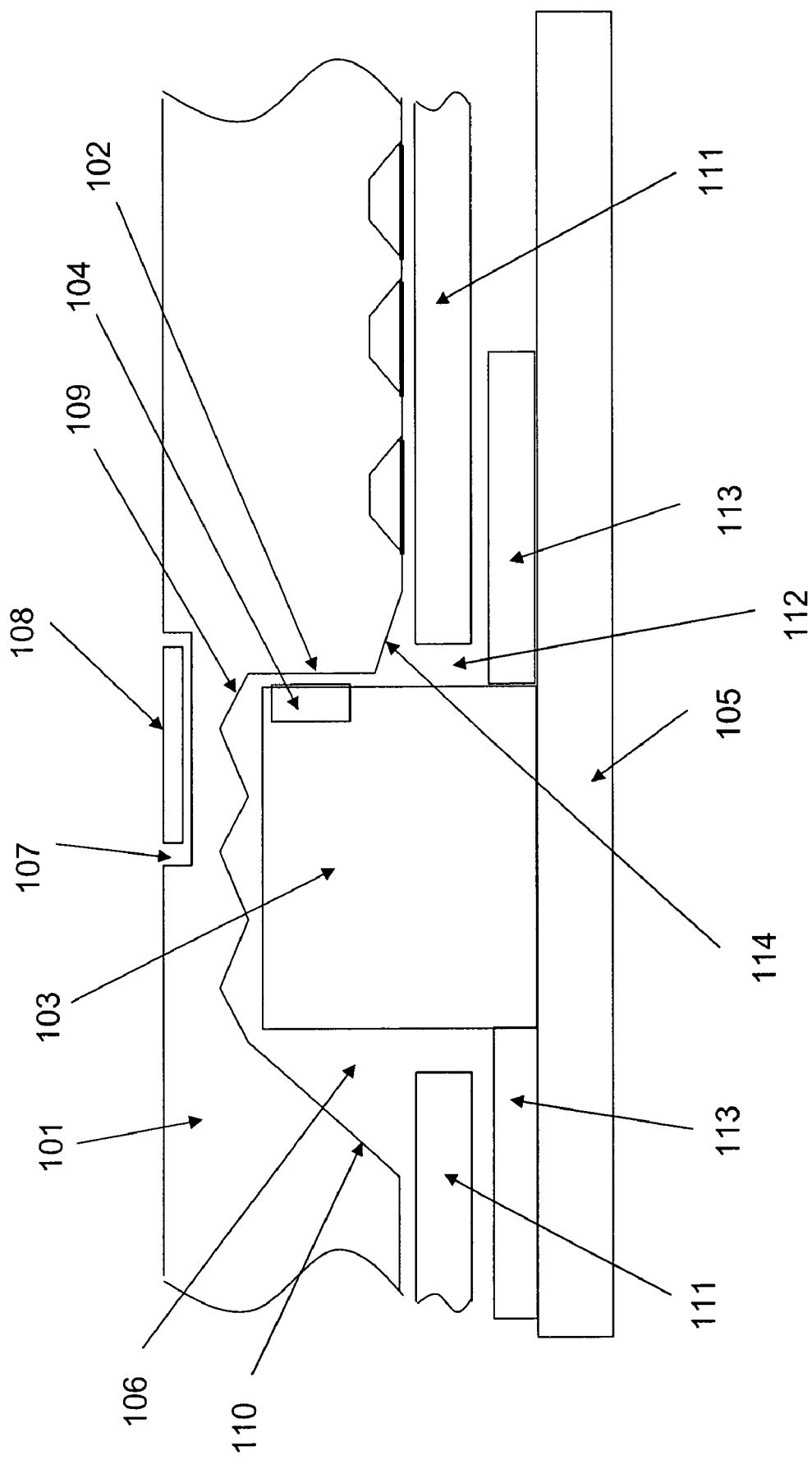
FIG. 18 illustrates another embodiment of the multilayered integrated backlight illumination assembly of the present invention.

FIG. 18 is a cross sectional view of a single film layer that may be utilized alone or in combination in a multilayered light film, having light distributing film (layer) 101 with a light input surface 102. The light input surface should be equal to or larger than the LED light emitting surface 103 in order to couple more light into the film for higher optical efficiency. With a pocket 106 there is a side emitting light source (LED) 103 with a light emitting area 104. The light source is mounted to PCB board 105 to aid in the electrical connection to drive the light source and also to help conduct heat away from the light source and to minimize any buildup inside pocket 106. The pocket is large enough to accommodate the heat expansions of PCB and LED. Additionally, there is another pocket or recessed area 107 on the viewer side of the light distributing film 101 above the LED 103 as well as all or part of the pocket 106. By providing a recessed area on top of the film any light blocker or light reflector 108 has a substantially flat, level or planar profile in relationship to the light distribution film. Any film that is positioned on the viewer side of the light distribution film therefore has a more uniform optical light entry profile and results in a more uniform luminance to the liquid crystal panel. The reflector material can be an individual reflector or a reflective film. The reflector 108 may be reflective on both sides or on one side only. This is to help manage bright spots of emission from the light source. The reflector 108 may be specular or diffusive on either one or both side or combination thereof. In another embodiment, the reflector 108 may also have some controlled light porosity or leakage in a manner to aid in the distribution of light above the reflector 108 in order to provide more uniform lighting. One means of achieving this is to provide pinhole-like non-continuities in the reflector. This can be done by a variety of means of patterning the reflector, printing a non-continuous pattern, perforating the reflective coating and or the support. While layer 108 is referred to has a reflector, it may also be a diffuser film (volume, holographic, surface or combination as well as asymmetric). It may also have a lens-like structure on at least one side to aid in light spreading or collimation. In an additional embodiment, the material used in layer 108 may comprise a means of polarization (including reflective polarization) in order to control bright spots but to maximize the amount and uniformity of light directed towards the viewer side.

FIG. 18 further has light redirecting features 109 on the viewer surface of the LED pocket 106. Light redirecting features 109 cover the spacing between LED 103 light emitting surface 104 and the light redistributing film light input surface 102. Light redirecting features 109 can be, for example, prismatic structure array, pyramidal structure array, negative micro-lens array, very high power positive micro-lens array, or scattering surface. They may be rows or individual features and their density, size or shape may vary depending of the light emitting profile of the light source that is not projected into the film at the desired TIR angle along the light redirecting features. The pocket or cavity in which the light source is positioned may also have a slop or angle 110 on the surface of LED pocket 106 opposite to the light input surface 102. This is useful in providing a slightly larger pocket that enables better heat control inside the pocket. Bottom reflector 111 covers the entire light redistributing film to recycle the light reflected from all other optical component between bottom reflector 111 and liquid crystal cell. A hole 112 in the bottom reflector 111 is provided to pass through the LED 102. The hole is large enough to accommodate the heat expansions of PCB and LED. Additional reflective material 113 may be laminated or attached on the PCB 105 adjacent to the LED 103 to provide sufficient light recycling on the area of the bottom reflector hole 112. The edges 114 of the LED pocket 106 can be sloped or rounded to provide stress relief for the sharp edges of the light redistributing film 101. The slope angle can be small enough so that the light still satisfies the total internal reflection condition on the light redistributing film 101 surfaces.

The invention claimed is:

1. A multilayered integrated backlight illumination assembly for an LCD display comprising:
   a substrate for providing structural and functional support to the assembly;
   a bottom reflector provided on the substrate;
   a plurality of solid state light sources provided in openings of the bottom reflector for providing a point light source;
   a plurality of primary light films having light redirecting areas provided between the plurality of solid state light sources for redirecting and spreading the point light source to a uniform plane of light;
   a plurality of secondary light films having light redirecting areas provided between the plurality of solid state light sources for redirecting and spreading the point light source to a uniform plane of light;
   a binding means for binding the primary and secondary light films together;
   a top diffuser for diffusing the uniform plane of light;
   wherein the plurality of primary and secondary light films each has a thickness between 0.1 mm to 1.0 mm and a bending stiffness between 50 to 1200 millinewtons; and
   further comprising a trichromatic sensor located on the point light source to correct or adjust both the luminance and color.

2. The backlight illumination assembly of claim 1 further comprising a heat sink located at a base of for the plurality of solid state light sources.

3. The backlight illumination assembly of claim 1 further comprising a plurality of multi-colored solid state light sources provided in a cavity of the plurality of light films for providing a secondary point light source.

4. The backlight illumination assembly of claim 1 wherein an end of the plurality of light films has a chamfered edge to aid in the spread of the light from the point light source.

5. The backlight illumination assembly of claim 1 further comprising a trench provided between the light redirecting areas to reduce light leakage between the light redirecting areas.

6. The backlight illumination assembly of claim 1 further comprising a patterned diffuser area in a top diffuser film.

7. A multilayered integrated backlight illumination assembly for an LCD display comprising:
   a substrate for providing structural and functional support to the assembly;
   a bottom reflector provided on the substrate;
   a plurality of solid state light sources provided in openings of the bottom reflector for providing a point light source;
   a plurality of primary light films having light redirecting areas provided between the plurality of solid state light sources for redirecting and spreading the point light source to a uniform plane of light;
   a plurality of secondary light films having light redirecting areas provided between the plurality of solid state light sources for redirecting and spreading the point light source to a uniform plane of light;
   a binding means for binding the primary and secondary light films together;
   a top diffuser for diffusing the uniform plane of light;
   wherein the plurality of primary and secondary light films each has a thickness between 0.1 mm to 1.0 ram and a bending stiffness between 50 to 1200 millinewtons; and
   wherein the trenches of the primary light films are offset from the trenches of the secondary light films.

8. A multilayered integrated backlight illumination assembly for an LCD display comprising:
   a substrate for providing structural and functional support to the assembly;
   a bottom reflector provided on the substrate;
   a plurality of solid state light sources provided in openings of the bottom reflector for providing a point light source;
   a plurality of primary light films having light redirecting areas provided between the plurality of solid state light sources for redirecting and spreading the point light source to a uniform plane of light;
   a plurality of secondary light films having light redirecting areas provided between the plurality of solid state light sources for redirecting and spreading the point light source to a uniform plane of light;
   a polymer layer with beads provided between the primary and secondary light films to adhere the films together;
   a top diffuser for diffusing the uniform plane of light; and
   wherein the plurality of primary and secondary light films each has a thickness between 0.1 mm to 1.0 mm and a bending stiffness between 50 to 1200 millinewtons.

9. A multilayered integrated backlight illumination assembly for an LCD display comprising:
   a substrate for providing structural and functional support to the assembly;
   a bottom reflector provided on the substrate;
   a plurality of multi-colored solid state light sources provided in openings of the bottom reflector for providing a red, green or blue point light source;
   a plurality of primary light films having light redirecting areas provided between the plurality of solid state light sources for redirecting and spreading any of the red, green or blue point light source to a uniform plane of light;
   a plurality of secondary light films having light redirecting areas provided between the plurality of solid state light sources for redirecting and spreading any of the red, green or blue point light source to a uniform plane of light;
   a plurality of tertiary light films having light redirecting areas provided between the plurality of solid state light sources for redirecting and spreading any of the red, green or blue point light source to a uniform plane of light;
   an adhesive pad provided between the primary, secondary and tertiary light films to adhere the films together;
   a plurality of color mixing sections provided in the plurality of light films for providing improved color uniformity from the multi-colored solid state light sources;
   a top diffuser for diffusing the uniform plane of light; and
   wherein the plurality of primary and secondary light films each has a thickness between 0.1 mm to 1.0 mm and a bending stiffness between 50 to 1200 millinewtons.

* * * * *